US009559351B2

(12) United States Patent
Mori et al.

(10) Patent No.: US 9,559,351 B2
(45) Date of Patent: Jan. 31, 2017

(54) NICKEL COMPOSITE HYDROXIDE PARTICLES AND NONAQUEOUS ELECTROLYTE SECONDARY BATTERY

(75) Inventors: Kensaku Mori, Niihama (JP); Rei Kokado, Niihama (JP); Shin Imaizumi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 176 days.

(21) Appl. No.: 14/001,722

(22) PCT Filed: Mar. 31, 2011

(86) PCT No.: PCT/JP2011/001943
§ 371 (c)(1),
(2), (4) Date: Aug. 27, 2013

(87) PCT Pub. No.: WO2012/131779
PCT Pub. Date: Oct. 4, 2012

(65) Prior Publication Data
US 2013/0337331 A1    Dec. 19, 2013

(51) Int. Cl.
*H01M 4/131*    (2010.01)
*H01M 4/505*    (2010.01)
(Continued)

(52) U.S. Cl.
CPC ............ *H01M 4/131* (2013.01); *C01G 53/006* (2013.01); *C01G 53/42* (2013.01); *H01M 4/0471* (2013.01);
(Continued)

(58) Field of Classification Search
None
See application file for complete search history.

(56) References Cited

U.S. PATENT DOCUMENTS

| 2002/0168570 A1* | 11/2002 | Hampden-Smith et al. ............ 429/218.1 |
| 2008/0311473 A1* | 12/2008 | Sasaoka ............ H01M 4/364 429/223 |

(Continued)

FOREIGN PATENT DOCUMENTS

| JP | 3-252318 A | 11/1991 |
| JP | 2003-208895 A | 7/2003 |

(Continued)

OTHER PUBLICATIONS

Park et al., "Electrochemical stability of core-shell structure electrode for high voltage cycling as positive electrode for lithium ion batteries" (Journal of Power Sources 174 (2007) 658-662).*

(Continued)

*Primary Examiner* — Miriam Stagg
*Assistant Examiner* — Carmen Lyles-Irving
(74) *Attorney, Agent, or Firm* — Kratz, Quintos & Hanson, LLP

(57) ABSTRACT

A method for producing nickel composite hydroxide particles may include: a first step of producing nuclei including primary particles by controlling the pH of an aqueous solution for nucleation, the aqueous solution for nucleation containing a metal compound having an atomic ratio of metals corresponding to an atomic ratio of metals in the nickel composite hydroxide particles and substantially not containing a metal complex ion-forming agent; and a second step of forming, on an outer surface of each of the nuclei, an outer shell portion including platy primary particles larger than primary particles of the nuclei by controlling the pH of an aqueous solution for particle growth containing the nuclei obtained in the nucleation step.

3 Claims, 9 Drawing Sheets

(51) Int. Cl.
 *H01M 4/525* (2010.01)
 *C01G 53/00* (2006.01)
 *H01M 4/04* (2006.01)

(52) U.S. Cl.
 CPC .......... *H01M 4/0497* (2013.01); *H01M 4/505* (2013.01); *H01M 4/525* (2013.01); *C01P 2004/03* (2013.01); *C01P 2004/51* (2013.01); *C01P 2004/61* (2013.01); *C01P 2004/84* (2013.01); *C01P 2006/12* (2013.01); *Y02E 60/122* (2013.01); *Y02P 70/54* (2015.11)

(56) References Cited

U.S. PATENT DOCUMENTS

| | | | | |
|---|---|---|---|---|
| 2009/0309063 | A1* | 12/2009 | Paulsen et al. | 252/182.33 |
| 2010/0099027 | A1 | 4/2010 | Kikuya et al. | |
| 2011/0065003 | A1* | 3/2011 | Chang et al. | 429/223 |
| 2012/0119167 | A1 | 5/2012 | Matsumoto et al. | |

FOREIGN PATENT DOCUMENTS

| | | |
|---|---|---|
| JP | 2004-253174 A | 9/2004 |
| JP | 2006-344567 A | 12/2006 |
| JP | 2007-265784 A | 10/2007 |
| JP | 2008-147068 A | 6/2008 |
| JP | 2009-117369 A | 5/2009 |
| WO | 2011/016372 A1 | 2/2011 |

OTHER PUBLICATIONS

Notification of Reasons for Refusal dated Sep. 23, 2014, corresponding to Chinese patent application No. 2014091800953820 with partial English translation.

"Synthetic optimization of Li[Ni$_{1/3}$Co$_{1/3}$Mn$_{1/3}$]O$_2$ via co-precipitation":, M.-H. Lee et al., Electrochimica Acta, , Vo. 50, pp. 939 to 948 dated Sep. 11, 2004, with English translation.

\* cited by examiner

F I G. 1
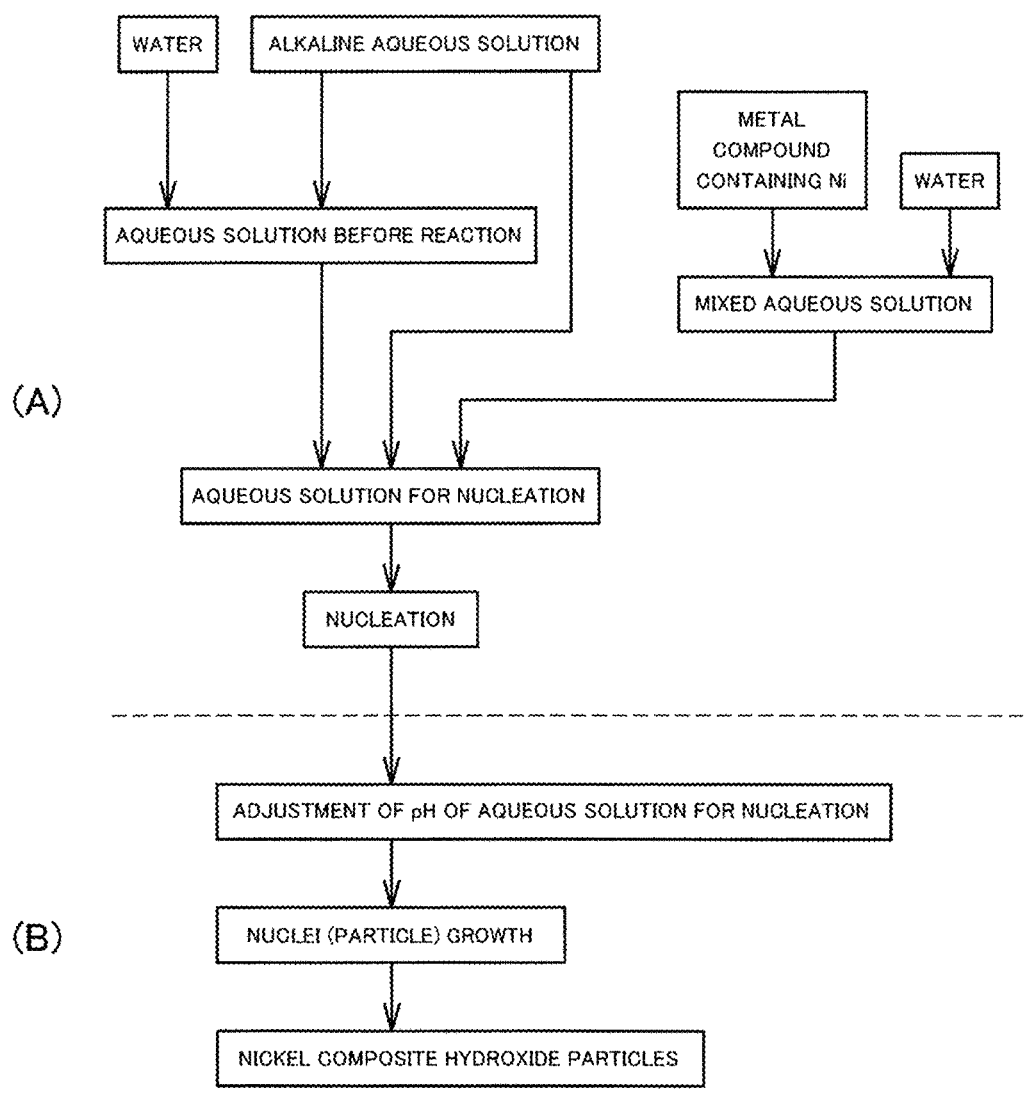

F I G. 5

| | Composite hydroxide | | Positive-electrode active material | | | Battery | | |
|---|---|---|---|---|---|---|---|---|
| | Average particle diameter ($\mu$m) | (d90-d10)/average particle diameter | Average particle diameter ($\mu$m) | (d90-d10)/average particle diameter | Specific surface area average particle diameter | Initial discharge capacity (mAh·g-1) | Positive electrode resistance ($\Omega$) | 500 cycle capacity retention rate (%) |
| Example 1 | 3.9 | 0.44 | 4.1 | 0.60 | 6.20 | 181.5 | 3.2 | 90% |
| Example 2 | 3.9 | 0.44 | 4.1 | 0.59 | 6.5 | 185.2 | 3.3 | 91% |
| Example 3 | 3.9 | 0.44 | 4 | 0.52 | 6.70 | 186.2 | 2.7 | 91% |
| Example 4 | 5.8 | 0.51 | 6.1 | 0.58 | 5.50 | 181.8 | 3.4 | 89% |
| Example 5 | 3.5 | 0.51 | 3.6 | 0.57 | 6.90 | 179.9 | 2.8 | 88% |
| Example 6 | 3 | 0.52 | 2.9 | 0.59 | 7.20 | 182.2 | 3.0 | 90% |
| Example 7 | 3.8 | 0.47 | 4.3 | 0.60 | 6.30 | 180.5 | 2.9 | 88% |
| Example 8 | 2.8 | 0.54 | 3.2 | 0.60 | 8.10 | 181.1 | 3.0 | 89% |
| Example 9 | 3.5 | 0.49 | 3.6 | 0.58 | 6.60 | 187.2 | 3.1 | 89% |
| Comparative Example 1 | 9.5 | 0.75 | 9.2 | 0.78 | 4.00 | 182 | 4.6 | 68% |
| Comparative Example 2 | 8.2 | 0.53 | 8.4 | 0.61 | 3.40 | 186.3 | 6.0 | 86% |
| Comparative Example 3 | 6.8 | 0.77 | – | – | – | – | – | – |
| Comparative Example 4 | 3.9 | 0.44 | 10.5 | 0.77 | 2.20 | – | – | – |
| Comparative Example 5 | 3.9 | 0.44 | 4.3 | 0.58 | 4.60 | 158.2 | 19.8 | – |
| | | | | | | | | |
| | | | | | | | | |

Hydroxide

FIG. 6
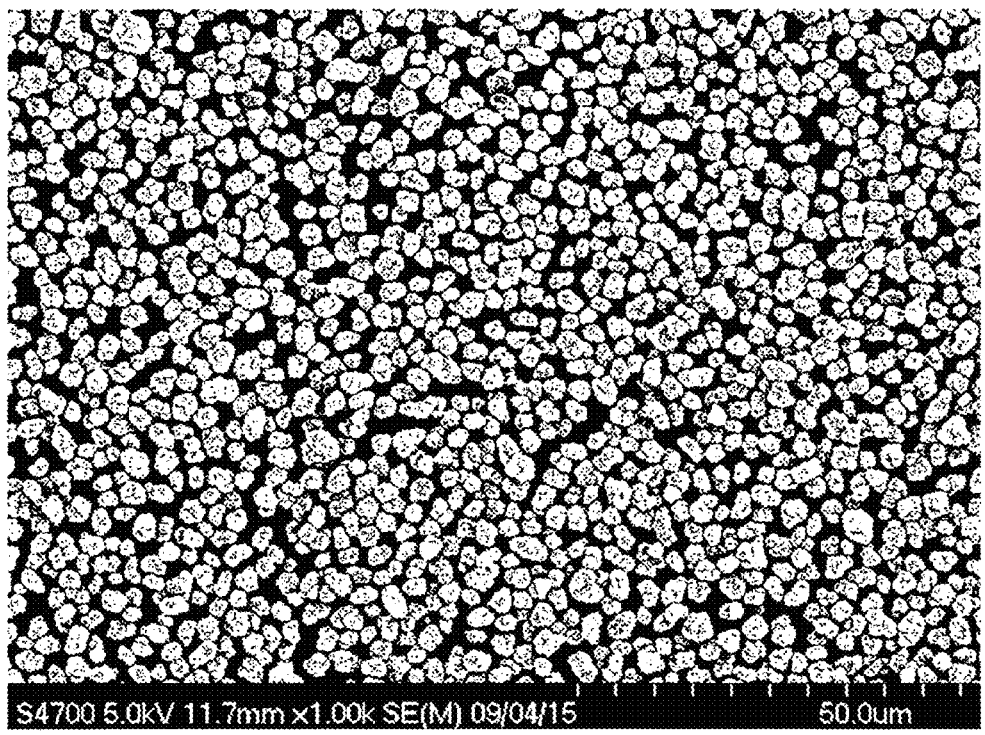
(A)
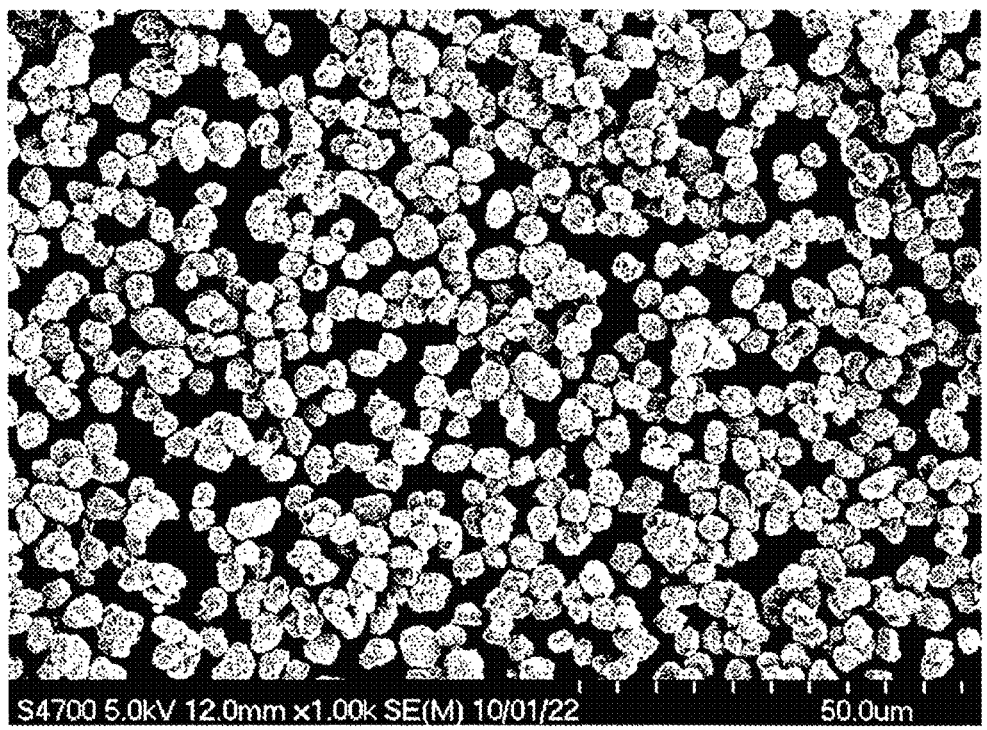
(B)

FIG. 7
(A)
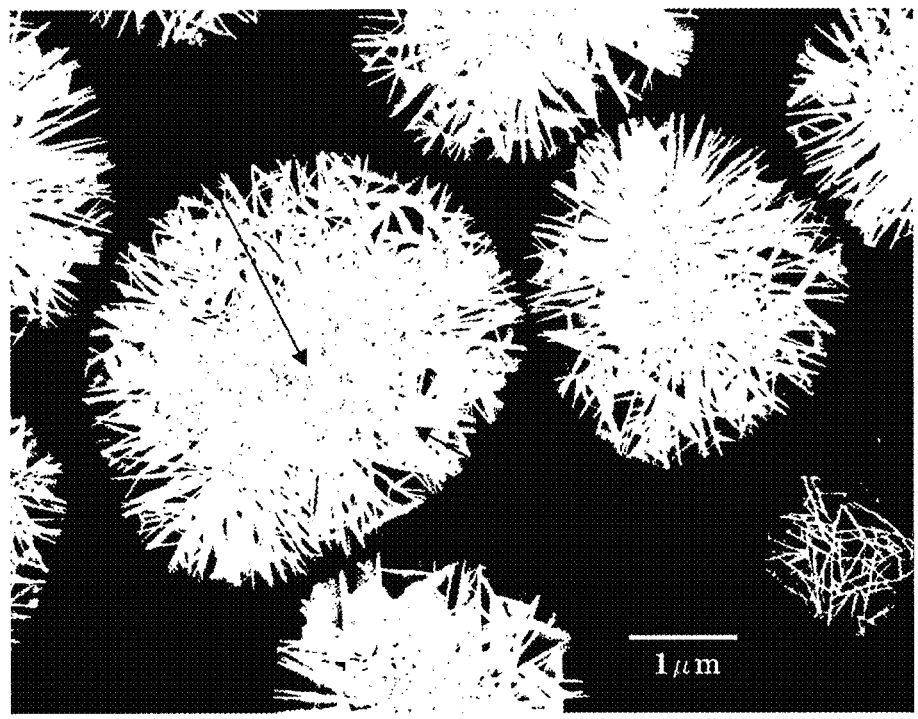
(B)
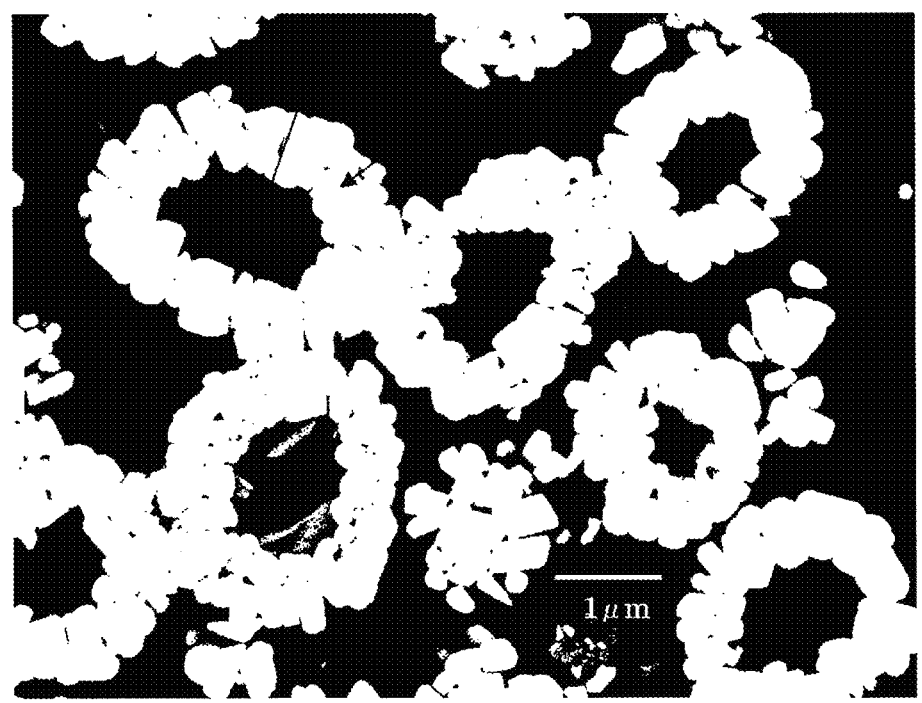

FIG. 9
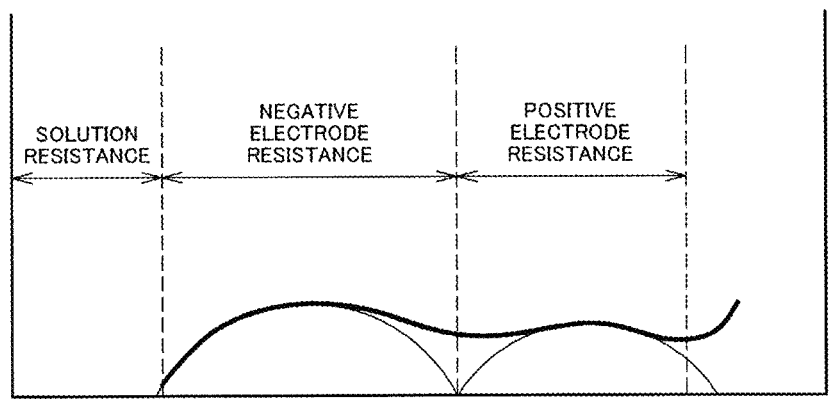
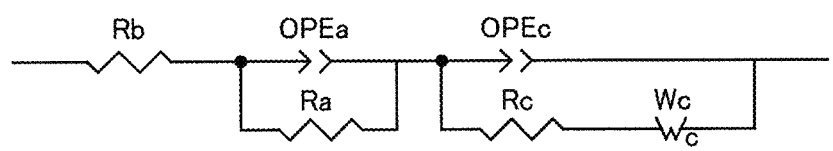

NICKEL COMPOSITE HYDROXIDE PARTICLES AND NONAQUEOUS ELECTROLYTE SECONDARY BATTERY

TECHNICAL FIELD

The present invention relates to nickel composite hydroxide particles and a nonaqueous electrolyte secondary battery. More particularly, the present invention relates to nickel composite hydroxide particles and a method for producing the same, a cathode active material for a nonaqueous electrolyte secondary battery and a method for producing the same, and a nonaqueous electrolyte secondary battery.

BACKGROUND ART

In recent years, along with the spread of mobile electronic devices such as mobile phones and notebook-sized personal computers, development of smaller and lighter nonaqueous electrolyte secondary batteries having a high energy density has been strongly demanded. Development of high power secondary batteries as batteries for electric automobiles typified by hybrid automobiles has also been strongly demanded. The secondary batteries that meet such demands are exemplified by lithium ion secondary batteries. Lithium ion secondary batteries include a negative electrode, a positive electrode, an electrolytic solution and the like, in which a material into and from which lithium can be inserted and desorbed has been used as an active material for the negative and positive electrodes.

Research and development of the lithium ion secondary batteries have been extensively performed at present, and in particular, lithium ion secondary batteries in which a layer or a spinel type lithium metal composite oxide is used as a positive electrode material can achieve a voltage as high as 4 V; therefore, practical applications thereof as batteries having a high energy density have been accelerated.

As positive electrode materials for such lithium ion secondary batteries, lithium composite oxides such as lithium cobalt composite oxide ($LiCoO_2$) which can be comparatively easily synthesized, lithium nickel composite oxide ($LiNiO_2$) in which nickel less expensive than cobalt is used, lithium nickel cobalt manganese composite oxide ($LiNi_{1/3}Co_{1/3}Mn_{1/3}O_2$), and lithium manganese composite oxide ($LiMn_2O_4$) in which manganese is used have been hitherto proposed.

In order to achieve favorable performances of positive electrodes (superior cycle characteristics, low resistance and high power), positive electrode materials are required to be formed with particles having a uniform and appropriate particle diameter. The grounds for such requirements are that use of a material having a large particle diameter and a small specific surface area leads to failure in reserving a sufficient area for reaction with the electrolytic solution, thereby resulting in an increase of the reaction resistance and failure in obtaining a battery having a high power, and that use of a material having a broad particle size distribution leads to lowering of the battery capacity, thereby resulting in defects such as an increase of the reaction resistance. The reason why the battery capacity is reduced is that nonuniformity of a voltage applied to the particles in the electrode causes fine particles to selectively deteriorate due to repetition of charge and discharge.

Additionally, when increase in output of batteries is intended, shortening a distance of transfer of lithium ions between the positive electrode and the negative electrode is effective. Therefore, thin positive electrode plates have been desired, and thus cathode active material particles having a small particle diameter are useful also to this end.

When further increase in output of batteries is intended, cathode active material particles having a small particle diameter and a large specific surface area are useful. For example, by reducing smoothness of surfaces of the particles, employing a porous structure for the particles themselves, or the like, the specific surface area can be increased even though the particle diameters of the particles are the same. This leads to increasing an area for reaction between the particles and the electrolytic solution and enables to enhance reactivity therebetween. Increase in output of batteries can therefore be expected.

Additionally, it is necessary to produce particles so as to have a small and uniform particle diameter and a large specific surface area also in the case of the above lithium nickel composite oxide in order to improve performances of the positive electrode material.

Patent Literature 1 discloses a lithium composite oxide in the form of particles having a particle size distribution exhibited on the particle size distribution curve thereof in which: an average particle diameter D50 which means that the particle diameter of the particles with the accumulation frequency of 50% is 3 to 15 μm; the minimum particle diameter is 0.5 μm or more; and the maximum particle diameter is 50 μm or less, and with respect to the relationship between D10 which means that the particle diameter of the particles with the accumulation frequency of 10% and D90 which means that the particle diameter of the particles with the accumulation frequency of 90%, D10/D50 is 0.60 to 0.90, whereas D10/D90 is 0.30 to 0.70. The Literature also discloses that the lithium composite oxide has high fillability, favorable charge and discharge capacity characteristics and high output characteristics, and is less likely to deteriorate even under conditions with a significant charging and discharging load; therefore, use of this lithium composite oxide can provide a lithium ion nonaqueous electrolytic solution secondary battery having excellent output characteristics with small deterioration of the cycle characteristics.

Patent Literature 2 discloses a cathode active material for a nonaqueous electrolytic solution secondary battery having at least a lithium-transition metal composite oxide with a layer structure in which the cathode active material for a nonaqueous electrolytic solution secondary battery includes the lithium-transition metal composite oxide formed with hollow particles having an outer shell portion outside and a space portion inside the outer shell portion. The Literature also discloses that the cathode active material for a nonaqueous electrolytic solution secondary battery has excellent battery characteristics such as cycle characteristics, output characteristics and thermal stability and is used suitably for lithium ion secondary batteries and the like.

Since the lithium composite oxide particles disclosed in Patent Literature 1 are particles whose minimum particle diameter is 0.5 μm or more and whose maximum particle diameter is 50 μm or less with respect to the average particle diameter of 3 to 15 μm, the lithium composite oxide particles include fine particles and coarse particles. The particle size distribution defined by the D10/D50 and D10/D90 described above therefore does not suggest a narrow range of the particle diameter distribution. Consequently, the lithium composite oxide disclosed in Patent Literature 1 does not correspond to particles having uniform particle diameters, and thus improvement of the performances of the positive electrode material is not expected even when such a lithium composite oxide is employed, indicating difficulty in obtaining a lithium ion nonaqueous electrolytic solution secondary battery having sufficient performances.

Since the cathode active material for a nonaqueous electrolytic solution secondary battery disclosed in Patent Literature 2 includes hollow particles, increase of the specific surface area can be expected comparing with solid particles; therefore, improvement in reactivity between the particles and the electrolytic solution can be expected because of the increase of the specific surface area. Patent Literature 2 however does not describe a particle diameter and a particle size distribution of the cathode active material for a nonaqueous electrolytic solution secondary battery, considering it to be equal in terms of quality to a conventional cathode active material. Therefore, there is a high possibility that selective deterioration of fine particles occurs due to non-uniformly applying a voltage in an electrode, resulting in a reduction in a battery capacity.

CITATION LIST

Patent Literature

Patent Literature 1: Japanese Patent Laid-Open No. 2008-147068
Patent Literature 2: Japanese Patent Laid-Open No. 2004-253174

SUMMARY OF INVENTION

Technical Problem

In view of the foregoing problems, an object of the present invention is to provide nickel composite hydroxide particles having a small and high uniform particle diameter and allowing a specific surface area of a cathode active material to become large when used as a raw material for the cathode active material, and a method for producing the same.

Another object of the present invention is to provide a cathode active material for a nonaqueous electrolyte secondary battery having a large specific surface area and capable of decreasing a value of positive electrode resistance when used in a battery, and a method for producing the same.

Still another object of the present invention is to provide a nonaqueous electrolyte secondary battery achieving excellent cycle characteristics and a high power.

Solution to Problem (Method for Producing Nickel Composite Hydroxide Particles)

A method for producing nickel composite hydroxide particles according to a first feature of the present invention is a method for producing nickel composite hydroxide particles represented by a general formula (I):

where: $0 \leq x \leq 0.22$; $0 \leq y \leq 0.15$; $x+y<0.3$; $0 \leq \alpha \leq 0.5$; and M is at least one additional element selected from the group consisting of Mg, Al, Ca, Ti, V, Cr, Mn, Zr, Nb, Mo and W, the method including: a nucleation step of producing nuclei including primary particles by controlling a pH of an aqueous solution for nucleation to 11.5 to 13.2 at a liquid temperature of 25° C. as a standard, the aqueous solution for nucleation containing a metal compound having an atomic ratio of metals corresponding to an atomic ratio of metals in the nickel composite hydroxide particles and substantially not containing a metal complex ion-forming agent; and a particle growth step of forming, on an outer surface of each of the nuclei, an outer shell portion including platy primary particles larger than primary particles of the nuclei by controlling a pH of an aqueous solution for particle growth containing the nuclei obtained in the nucleation step to 9.5 to 11.0 at a liquid temperature of 25° C. as a standard.

A method for producing nickel composite hydroxide particles according to a second feature of the present invention is the first feature of the present invention, further comprising: preparing the aqueous solution for particle growth by adjusting the pH of the aqueous solution for nucleation after completing the nucleation step.

A method for producing nickel composite hydroxide particles according to a third feature of the present invention is the first feature of the present invention, further comprising: preparing an aqueous solution suitable for the particle growth; adding nuclei formed in the nucleation step to the aqueous solution; and preparing the aqueous solution for particle growth.

A method for producing nickel composite hydroxide particles according to a fourth feature of the present invention is the first, second or third feature of the present invention, further comprising: performing the particle growth step after discharging a part of a liquid portion of the aqueous solution for particle growth after the nucleation step.

A method for producing nickel composite hydroxide particles according to a fifth feature of the present invention is the first, second, third, or fourth feature of the present invention, further comprising: maintaining a temperature of each aqueous solution at 60° C. or more in the nucleation step and the particle growth step.

A method for producing nickel composite hydroxide particles according to a sixth feature of the present invention is the first, second, third, fourth, or fifth feature of the present invention, further comprising: covering the nickel composite hydroxide obtained in the particle growth step with a compound having at least one of the additional elements in a molecule.

(Nickel Composite Hydroxide Particles)

Nickel composite hydroxide particles according to a seventh feature of the present invention include a nickel composite hydroxide represented by the general formula (I):

where: $0 \leq x \leq 0.22$; $0 \leq y \leq 0.15$; $x+y<0.3$; $0 \leq \alpha \leq 0.5$; and M is at least one additional element selected from the group consisting of Mg, Al, Ca, Ti, V, Cr, Mn, Zr, Nb, Mo and W, the nickel composite hydroxide particles being spherical secondary particles formed by aggregation of a plurality of primary particles, wherein the secondary particles have an average particle diameter of 2 to 7 μm, and a value represented by an expression of: [(d90−d10)/average particle diameter] as a marker indicating spreading of a particle size distribution is 0.55 or less, and each of the secondary particles has a central portion of primary particles and an outer shell portion of platy primary particles outside the central portion, the platy primary particles being larger than the primary particles forming the central portion.

Nickel composite hydroxide particles according to an eighth feature of the present invention are the seventh feature of the present invention, wherein an average particle diameter of the primary particles forming the central portion is 0.01 to 0.3 μm, while an average particle diameter of the platy primary particles is 0.3 to 3 μm.

Nickel composite hydroxide particles according to a ninth feature of the present invention are the seventh or eighth feature of the present invention, wherein the primary particles forming the central portion have a platy shape and/or a needle shape.

Nickel composite hydroxide particles according to a tenth feature of the present invention are the seventh, eighth, or ninth feature of the present invention, wherein a thickness of the outer shell portion is 0.3 to 3 µm in the secondary particles.

Nickel composite hydroxide particles according to an eleventh feature of the present invention are the seventh, eighth, ninth, or tenth feature of the present invention, wherein at least one of the additional elements are uniformly distributed inside the secondary particles and/or surfaces thereof are uniformly covered with at least one of the additional elements.

Nickel composite hydroxide particles according to a twelfth feature of the present invention are the seventh, eighth, ninth, tenth, or eleventh feature of the present invention, wherein the nickel composite hydroxide particles are produced by the method according to the first, second, third, fourth, fifth, or sixth feature of the present invention.

(Method for Producing Cathode Active Material for Nonaqueous Electrolyte Secondary Battery)

A method for producing a cathode active material for a nonaqueous electrolyte secondary battery according to a thirteenth feature of the present invention is a method for producing a cathode active material including a lithium nickel composite oxide and represented by a general formula (II):

where: 0.95≤t≤1.15; 0≤x≤0.22; 0≤y≤0.15; x+y<0.3; and M is at least one additional element selected from the group consisting of Mg, Al, Ca, Ti, V, Cr, Mn, Zr, Nb, Mo and W, the method comprising: a step of subjecting the nickel composite hydroxide particles according to the seventh, eighth, ninth, tenth, eleventh, or twelfth feature of the present invention to a heat treatment; a mixing step of preparing a lithium mixture by mixing a lithium compound with particles after the heat treatment; and a calcinating step of calcinating the lithium mixture prepared in the mixing step at a temperature of 700° C. to 850° C.

A method for producing a cathode active material for a nonaqueous electrolyte secondary battery according to a fourteenth feature of the present invention is the thirteenth feature of the present invention, further comprising: adjusting a ratio of the number of atoms of lithium to a sum of the number of atoms of metal other than lithium in the lithium mixture (the number of atoms of lithium/the sum of the number of atoms of metal other than lithium) to 0.95/1 to 1.15/1.

A method for producing a cathode active material for a nonaqueous electrolyte secondary battery according to a fifteenth feature of the present invention is the thirteenth or fourteenth feature of the present invention, further comprising: after the calcinating step, washing the lithium nickel composite oxide with water, followed by filtering and drying.

A method for producing a cathode active material for a nonaqueous electrolyte secondary battery according to a sixteenth feature of the present invention is the thirteenth, fourteenth or fifteenth feature of the present invention, further comprising: before the calcinating step, performing calcination at a temperature at which the lithium compound can react with the particles after the heat treatment.

(Cathode Active Material for Nonaqueous Electrolyte Secondary Battery)

A cathode active material for a nonaqueous electrolyte secondary battery according to a seventeenth feature of the present invention is a cathode active material including a lithium nickel composite oxide of a lithium-containing composite oxide and represented by the general formula (II):

where: 0.95≤t≤1.15; 0≤x≤0.22; 0≤y≤0.15; x+y<0.3; and M is at least one additional element selected from the group consisting of Mg, Al, Ca, Ti, V, Cr, Mn, Zr, Nb, Mo and W, wherein the cathode active material has an average particle diameter of 2 to 8 µm, a value represented by an expression of: [(d90−d10)/average particle diameter] as a marker indicating spreading of a particle size distribution is 0.65 or less, and a value represented by an expression of [specific surface area×average particle diameter] as a marker indicating a size of an area for reaction is 5.5 or more.

A cathode active material for a nonaqueous electrolyte secondary battery according to an eighteenth feature of the present invention is the seventeenth feature of the present invention, wherein the cathode active material for a nonaqueous electrolyte secondary battery is formed with hollow particles each of which has a space portion in a central portion of a lithium nickel composite oxide particle and an outer shell portion formed with the lithium nickel composite oxide outside the space portion.

A cathode active material for a nonaqueous electrolyte secondary battery according to a nineteenth feature of the present invention is the eighteenth feature of the present invention, wherein an average thickness of the outer shell portions is 0.3 to 3 µm at cross sections of the lithium nickel composite oxide particles.

A cathode active material for a nonaqueous electrolyte secondary battery according to a twentieth feature of the present invention is the seventeenth, eighteenth, or nineteenth feature of the present invention, wherein the cathode active material for a nonaqueous electrolyte secondary battery is produced by the method according to the thirteenth, fourteenth, fifteenth, or sixteenth feature of the present invention.

(Nonaqueous Electrolyte Secondary Battery)

A nonaqueous electrolyte secondary battery according to a twenty-first feature of the present invention includes: a positive electrode formed with the cathode active material for a nonaqueous electrolyte secondary battery according to the seventeenth, eighteenth, nineteenth, or twentieth feature of the present invention.

Advantageous Effects of Invention (Method for Producing Nickel Composite Hydroxide Particles)

According to the first feature of the present invention, growth of the nuclei is inhibited, and thus substantially only the nucleation can be caused in the nucleation step by adjusting the pH of the aqueous solution for nucleation to 11.5 to 13.2 at the liquid temperature of 25° C. as a standard. Further, in the particle growth step, only nuclear growth can be preferentially caused by adjusting the pH of the aqueous solution for particle growth to 9.5 to 11.0 at the liquid temperature of 25° C. as a standard, whereby formation of additional nuclei can be inhibited. Since the nuclei can therefore uniformly grow, uniform nickel composite hydroxide particles having a narrow range of the particle size distribution can be obtained. Moreover, by adjusting the pH to 9.5 to 11.0, a precipitation rate decreases. Therefore, as the nuclei produced in the nucleation step being a center, the platy primary particles larger than the primary particles of the nuclei are precipitated and grow on outer surfaces thereof. Then, the nickel composite hydroxide particles can be produced each of which has fine primary particles in the central portion and the outer shell portion formed around the central portion with the platy primary particles larger than the primary particles in the central portion.

According to the second feature of the present invention, the aqueous solution for particle growth can be obtained by adjusting the pH of the aqueous solution for nucleation after completing the nucleation step. Therefore, transfer to the particle growth step can be rapidly executed.

According to the third feature of the present invention, the nucleation and the particle growth can be more clearly separated; therefore, a liquid state in each step can be brought into optimal conditions for each step. Thus, the produced nickel composite hydroxide particles can have a narrower range of the particle size distribution and can be more uniform.

According to the fourth feature of the present invention, since a concentration of the nickel composite hydroxide particles in the aqueous solution for nucleation can be increased, the nickel composite hydroxide particles can grow in the state of a high concentration of the particles. Thus, the particle size distribution of the nickel composite hydroxide particles can be further narrowed, and a particle density can also be increased.

According to the fifth feature of the present invention, solubility of metal ions can be adjusted to an appropriate state, thereby being able to form nuclei with a regulated shape and particle diameter in the nucleation step. The formation of the platy primary particles can be then facilitated in the particle growth step, thereby certainly being able to form the nickel composite hydroxide particles each having the outer shell portion formed around the central portion with the platy primary particles larger than the primary particles in the central portion.

According to the sixth feature of the present invention, durability and output characteristics of a battery can be improved when the cathode active material for a battery that is formed using as a raw material the nickel composite hydroxide particles produced according to the method of the present invention is used for the battery.

(Nickel Composite Hydroxide Particles)

According to the seventh feature of the present invention, when the nickel composite hydroxide particles are mixed with a lithium compound and calcinated, lithium can be sufficiently diffused in the nickel composite hydroxide particles, whereby favorable cathode active material particles having uniform distribution of lithium can be obtained. Additionally, when the cathode active material particles are produced using the nickel composite hydroxide particles as a raw material, particles having hollow space forming inside thereof are obtained by a difference of shrinkage conditions between the primary particles in the central portion and the primary particles in the outer shell portion at the time of calcinating. The cathode active material particles can therefore be made uniform with a narrow range of the particle size distribution and large specific surface area. Thus, when a battery having a positive electrode including the cathode active material particles is formed, the electrode resistance can be reduced and deterioration of the electrode can be inhibited even though charge and discharge are repeated.

According to the eighth feature of the present invention, hollow cathode active material particles can be formed which have an appropriate particle diameter and space with an appropriate volume inside thereof when the nickel composite hydroxide particles are calcinated.

According to the ninth feature of the present invention, the central portions of the nickel composite hydroxide particles can be made to have a low density, thereby being able to form space with an appropriate volume inside the cathode active material particles obtained by calcinating the nickel composite hydroxide particles.

According to the tenth feature of the present invention, shrinkage of the primary particles in the outer shell portion due to the calcinating is small in the nickel composite hydroxide particle; therefore, also in the cathode active material particles obtained by calcinating the nickel composite hydroxide particles, a thickness of the outer shell portion is maintained to be approximately equal to the thickness of the nickel composite hydroxide particle before the calcinating. Accordingly, the cathode active material particles having an appropriate particle diameter and space with an appropriate volume inside thereof can be formed by forming the nickel composite hydroxide particles so as to have 0.3 to 3 μm of thickness of the outer shell portions.

According to the eleventh feature of the invention, durability and output characteristics of a battery can be improved when the cathode active material particles for a battery that are formed using as a raw material the nickel composite hydroxide particles of the present invention is used for the battery.

According to the twelfth feature of the present invention, since nickel composite hydroxide particles being uniform with a narrow range of the particle size distribution and having fine primary particles with an appropriate volume inside thereof can be provided, when cathode active material particles are produced using the nickel composite hydroxide particles as a raw material, uniform cathode active material particles with a narrow range of the particle size distribution, further with a large specific surface area because of the hollow structure can be obtained. Thus, when a battery having a positive electrode including the cathode active material particles is formed, the electrode resistance can be reduced and deterioration of the electrode can be inhibited even though charge and discharge are repeated.

(Method for Producing Cathode Active Material for Non-aqueous Electrolyte Secondary Battery)

According to the thirteenth feature of the invention, residual moisture of the nickel composite hydroxide particles can be removed by a heat treatment, and thus variation of the ratio of the number of atoms of lithium to the sum of the numbers of atoms of metals in the produced cathode active material particles can be prevented. Moreover, since calcinating is performed at a temperature of 700° C. to 850° C., lithium can be sufficiently diffused in the cathode active material particles, as well as the shape of the cathode active material particles can be maintained to be spherical. Since the nickel composite hydroxide particles having fine primary particles in the central portions are calcinated, the formed cathode active material particles have hollow space with an appropriate volume inside thereof. Therefore, when a battery having a positive electrode formed with thus produced cathode active material particles is produced, a battery capacity can be increased, as well as a positive electrode resistance can be reduced.

According to the fourteenth feature of the present invention, when a positive electrode is formed using the obtained cathode active material particles, a reaction resistance at the positive electrode can be reduced, and decrease in initial discharge capacity can be prevented.

According to the fifteenth feature of the present invention, when the cathode active material is used for a nonaqueous electrolyte secondary battery, excessive lithium compounds causing a side reaction can be removed; therefore, the durability and output characteristics of the battery can be improved.

According to the sixteenth feature of the present invention, a uniform lithium nickel composite oxide can be obtained because lithium can be sufficiently diffused.

(Cathode Active Material for Nonaqueous Electrolyte Secondary Battery)

According to the seventeenth feature of the present invention, when the cathode active material particles for a nonaqueous electrolyte secondary battery are used for a battery, high power characteristics and capacity of the battery can be realized.

According to the eighteenth feature of the present invention, when a positive electrode is formed with the obtained cathode active material particles, a reaction resistance at the positive electrode can be reduced.

According to the nineteenth feature of the present invention, strength of the cathode active material particles can be maintained while ensuring the space in the central portions. This enables to prevent generation of fine powder due to breaking down the particles at the time of producing a battery.

According to the twentieth feature of the present invention, the cathode active material particles are provided as uniform particles having a narrow range of the particle size distribution and a large specific surface area; therefore, when a battery having a positive electrode including this cathode active material particles is formed, the electrode resistance can be reduced and deterioration of the electrode can be inhibited even though charge and discharge are repeated.

(Nonaqueous Electrolyte Secondary Battery)

According to the twenty-first feature of the present invention, a battery having a high initial discharge capacity of 170 mAh/g or more and a low positive electrode resistance can be provided, and the thermal stability and safety can also be improved.

BRIEF DESCRIPTION OF DRAWINGS

FIG. 1 is a schematic flow chart illustrating steps of producing a nickel composite hydroxide of the present invention.

FIG. 5 is a table showing results of Examples and Comparative Examples.

FIG. 6 shows (A) an SEM photograph (magnification of observation: ×1,000) of the nickel composite hydroxide of the present invention and (B) an SEM photograph (magnification of observation: ×1,000) of the lithium nickel composite oxide of the present invention.

FIG. 7 shows (A) a photograph of a cross section (magnification of observation: ×10,000) of the nickel composite hydroxide of the present invention and (B) a photograph of a cross section (magnification of observation: ×10,000) of the lithium nickel composite oxide of the present invention.

FIG. 9 shows an example of measurement for evaluation of an impedance, and a schematic explanatory diagram of an equivalent circuit used in analysis.

DESCRIPTION OF EMBODIMENTS

Figure 2:
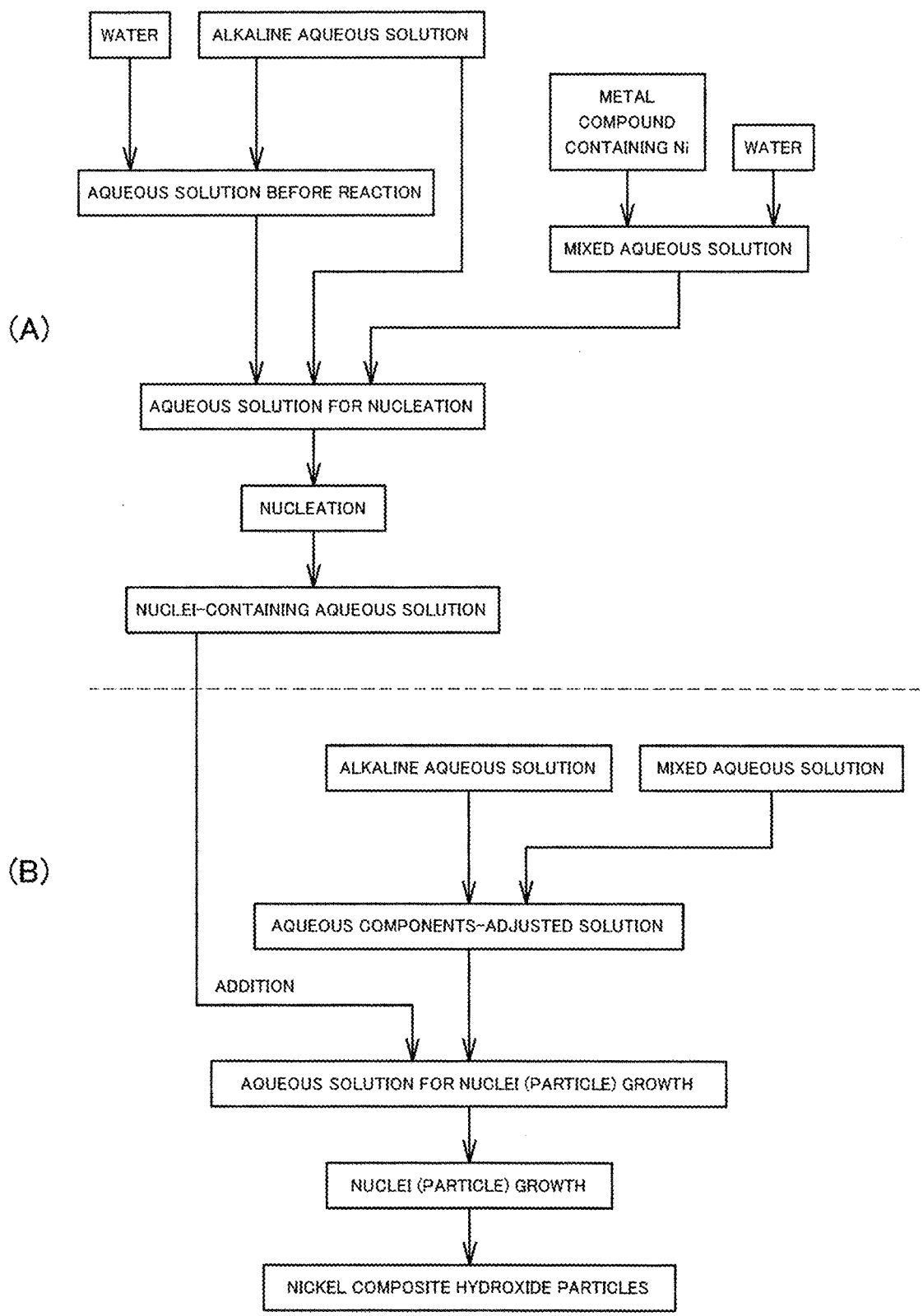
FIG. 2 is a schematic flow chart illustrating other steps of producing the nickel composite hydroxide of the present invention.

The present invention relates to: (1) a nonaqueous electrolyte secondary battery; (2) a cathode active material for a nonaqueous electrolyte secondary battery used for the positive electrode of the nonaqueous electrolyte secondary battery, and a method for producing the same; (3) nickel composite hydroxide particles used as a row material of the cathode active material for a nonaqueous electrolyte secondary battery, and a method for producing the same.

In order to improve a performance of the nonaqueous electrolyte secondary battery, it is necessary to use an electrode in which a cathode active material for a nonaqueous electrolyte secondary battery excellent in battery characteristics is employed. In order to obtain such a cathode active material for a nonaqueous electrolyte secondary battery excellent in battery characteristics, a particle diameter and a particle size distribution thereof are important factors. It is preferable to employ a cathode active material having a desired particle diameter and a large specific surface area, and being adjusted to have a desired particle size distribution. In order to obtain such a cathode active material, it is necessary to use nickel composite hydroxide particles as the raw material thereof having a predetermined structure, a desired particle diameter and a desired particle size distribution.

The present invention relates to, as described above, a method for producing the nickel composite hydroxide particles affecting a performance of the nonaqueous electrolyte secondary battery of a final product, as uniform particles having a narrow range of the particle size distribution and the predetermined structure, and to the nickel composite hydroxide particles produced by this method.

Additionally, a method for producing the cathode active material for a nonaqueous electrolyte secondary battery having a desired particle diameter and a large specific surface area, and being adjusted to have a desired particle size distribution using, as a raw material, the uniform nickel composite hydroxide particles having a narrow range of the particle size distribution and the predetermined structure and produced by the aforementioned method, and the cathode active material for a nonaqueous electrolyte secondary battery produced by the aforementioned method are also provided according to the present invention.

Furthermore, a nonaqueous electrolyte secondary battery having a positive electrode for which the cathode active material for a nonaqueous electrolyte secondary battery that is produced by the method of the present invention, has a desired particle diameter and a large specific surface area, and is adjusted to have a desired particle size distribution is used is also provided according to the present invention.

Hereinafter, the present invention is described in detail. However, before describing the method for producing the nickel composite hydroxide particles and the nickel composite hydroxide particles, which exhibit the most characteristic features of the present invention, the nonaqueous electrolyte secondary battery of a final product, as well as the method for producing the cathode active material for a nonaqueous electrolyte secondary battery using the nickel composite hydroxide particles as a raw material, and the cathode active material for a nonaqueous electrolyte secondary battery are described.

(1) Nonaqueous Electrolyte Secondary Battery

Figure 4:
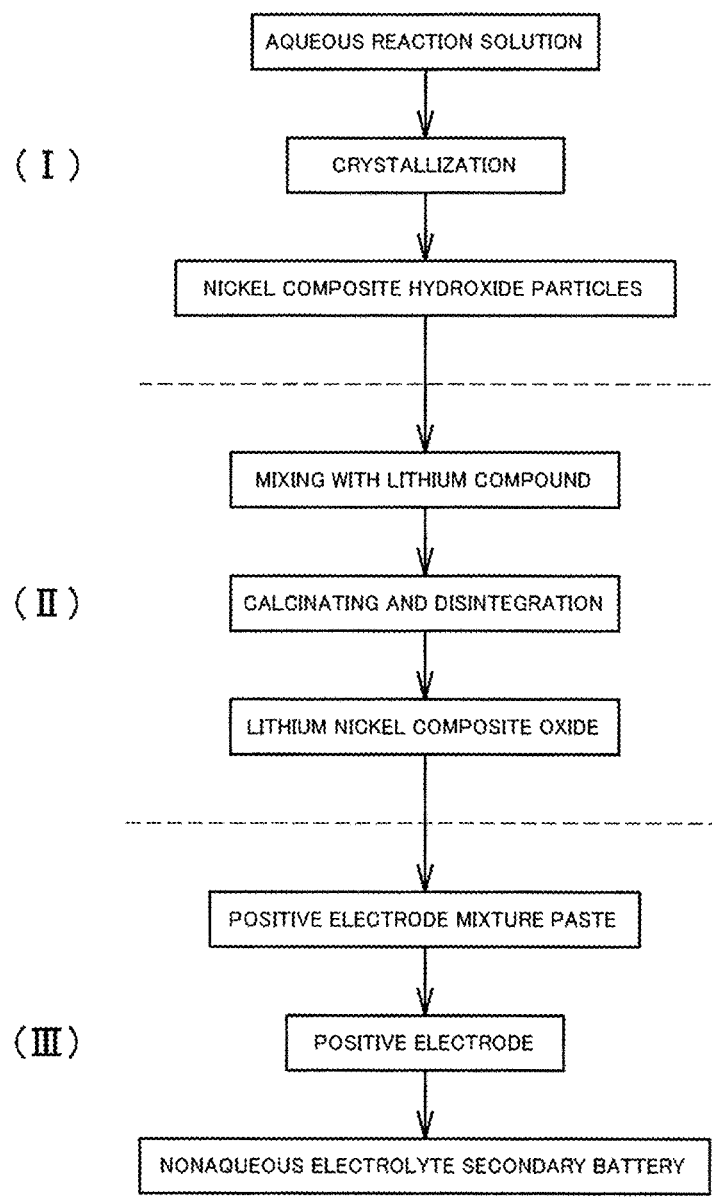
FIG. 4 is a schematic flow chart illustrating steps from production of the nickel composite hydroxide of the present invention until production of a nonaqueous electrolyte secondary battery.

The nonaqueous electrolyte secondary battery of the present invention includes a positive electrode for which the cathode active material for a nonaqueous electrolyte secondary battery (2) described later is used, as shown in FIG. 4. Since the positive electrode is used for the nonaqueous electrolyte secondary battery of the present invention, the battery has a high initial discharge capacity of 170 mAh/g or more and a low positive electrode resistance and exhibits excellent thermal stability and safety.

A structure of the nonaqueous electrolyte secondary battery of the present invention is first described.

The nonaqueous electrolyte secondary battery of the present invention (hereinafter, simply referred to as the secondary battery of the present invention) has a structure substantially similar to the structure of general nonaqueous electrolyte secondary batteries except that the cathode active material for a nonaqueous electrolyte secondary battery of the present invention (hereinafter, simply referred to as the cathode active material of the present invention) is used as a material of the positive electrode.

Specifically, the secondary battery of the present invention includes a case, and a positive electrode, a negative electrode, a nonaqueous electrolytic solution and a separator enclosed in the case. More specifically, the secondary battery of the present invention is formed by: laminating the positive electrode and the negative electrode via the separator to form an electrode assembly; impregnating thus obtained electrode assembly with a nonaqueous electrolytic solution; connecting between a positive electrode collector of the positive electrode and a positive electrode terminal communicating with the exterior, and between a negative electrode collector of the negative electrode and a negative electrode terminal communicating with the exterior using leads for power collection or the like; and sealing the case. It should be noted that the structure of the secondary battery of the present invention is not limited to the above example, and a variety of forms may be employed for the external configuration such as a cylindrical form or a stacked form.

(Structure of Each Part of Secondary Battery)

Next, a structure of each part of the secondary battery according to the present invention is described.

(Positive Electrode)

The positive electrode exhibiting a feature of the secondary battery of the present invention is first described below.

The positive electrode of a sheet-shaped member is formed by coating, for example, a surface of a collector made of an aluminum foil with a positive electrode mixture paste including the cathode active material of the present invention, followed by drying.

The positive electrode is appropriately subjected to a treatment depending on the battery to be used. For example, following treatments may be performed such as a cutting treatment for formation so as to have an appropriate size depending on a size of the intended battery, and a compression treatment by roll pressing for increasing electrode density.

(Positive Electrode Mixture Paste)

The positive electrode mixture paste can be obtained by adding a solvent to the positive electrode mixture, followed by kneading. The positive electrode mixture can also be obtained by mixing the cathode active material of the present invention in a powdery form with a conductive material and a binder.

The conductive material is used for imparting an adequate electric conductivity to the electrode. While this conductive material is not particularly limited, examples of the conductive material include graphite (natural graphite, artificial graphite and expanded graphite, etc.), or carbon black such as acetylene black or Ketjen black.

The binder serves to bind the cathode active material particles. While the binder used for the positive electrode mixture is not particularly limited, examples of the binder include polyvinylidene fluoride (PVDF), polytetrafluoroethylene (PTFE), fluorine rubber, ethylene-propylenediene rubber, styrene-butadiene rubber (SBR), cellulose and polyacrylic acid.

An activated charcoal or the like may be added to the positive electrode mixture. By adding an activated charcoal or the like, electric double layer capacity of the positive electrode can be increased.

The solvent dissolves the binder to cause the cathode active material, the conductive material, the activated charcoal and the like to disperse in the binder. While this solvent is not particularly limited, example of the solvent includes an organic solvent such as N-methyl-2-pyrrolidone.

Moreover, a mixing ratio of each component in the positive electrode mixture paste is not particularly limited. For example, provided that the solid content of the positive electrode mixture excluding the solvent is 100 parts by mass, a content of the cathode active material may be 60 to 95 parts by mass, a content of the conductive material may be 1 to 20 parts by mass, and a content of the binder may be 1 to 20 parts by mass, similarly to the case of positive electrodes of general nonaqueous electrolyte secondary batteries.

(Negative Electrode)

The negative electrode is a sheet-shaped member formed by coating a surface of a metal foil collector such as copper with a negative electrode mixture paste, followed by drying. Although components of the negative electrode mixture paste, a material of the collector and the like are different from those of the positive electrode, this negative electrode can be produced by a substantially similar manner to the positive electrode described above, and subjected to various types of treatments as needed also similarly thereto.

The negative electrode mixture paste is prepared in a paste form by adding a suitable solvent to a negative electrode mixture prepared by mixing a negative-electrode active material and a binder.

As the negative-electrode active material, for example, a substance containing lithium such as metal lithium or a lithium alloy, or an occlusion substance in and from which lithium ions are occluded and desorbed may be employed.

While the occlusion substance is not particularly limited, examples of the occlusion substance include natural graphite, artificial graphite, calcinated products of an organic compound such as a phenol resin, and powdery matter of a carbon substance such as coke. When such an occlusion substance is used for the negative-electrode active material, a fluorocarbon resin such as polyvinylidene fluoride (PVDF) may be used as a binder similarly to the positive electrode. A solvent may be used for dispersing the negative-electrode active material in the binder. Example of the solvent includes an organic solvent such as N-methyl-2-pyrrolidone.

(Separator)

A separator is disposed to be sandwiched between the positive electrode and the negative electrode, thereby separating the positive electrode from the negative electrode, and has a function to retain the electrolyte. As such a separator, a thin membrane of, for example, a polyethylene or polypropylene having a large number of fine pores may be used; however, not particularly limited thereto as long as it has the aforementioned function.

(Nonaqueous Electrolytic Solution)

The nonaqueous electrolytic solution is prepared by dissolving a lithium salt as a supporting salt in an organic solvent.

Examples of the organic solvent include cyclic carbonates such as ethylene carbonate, propylene carbonate, butylene carbonate and trifluoropropylene carbonate; chain carbonates such as diethyl carbonate, dimethyl carbonate, ethylmethyl carbonate and dipropyl carbonate; ether compounds such as tetrahydrofuran, 2-methyltetrahydrofuran and dimethoxyethane; sulfur compounds such as ethylmethylsulfone and butanesulfone; and phosphorus compounds such as triethyl phosphate and trioctyl phosphate. The present invention is however not limited to these examples. One alone or at least two as a mixture selected from these organic substances may be used.

Examples of a supporting salt include $LiPF_6$, $LiBF_4$, $LiClO_4$, $LiAsF_6$, $LiN(CF_3SO_2)_2$, and composite salts thereof.

Still more, the nonaqueous electrolytic solution may contain a radical scavenger, a surfactant, a fire retardant and the like for improving battery characteristics.

(Characteristics of Secondary Battery of the Present Invention)

Since the secondary battery of the present invention has the above configuration and the above positive electrode is used therein, a high initial discharge capacity of 170 mAh/g or more and a low positive electrode resistance are attained, whereby a high capacity and a high power are achieved. Also, in comparison with conventional cathode active materials of lithium nickel oxide, the secondary battery of the present invention has excellent thermal stability and safety.

(Application of Secondary Battery of the Present Invention)

The secondary battery of the present invention can be used for electric power supplies of small-size mobile electronic devices that consistently require a high capacity (notebook-sized personal computers, mobile phone terminals, etc.), because of the aforementioned properties. The secondary battery of the present invention can also be used suitably for batteries for electric automobiles that require a high power. When a battery for electric automobiles has a larger size, securing safety may be difficult and providing an expensive protective circuit is essential. However, the secondary battery of the present invention not only facilitates securing of the safety but simplifies an expensive protective circuit to enable the cost to be reduced because the battery has excellent safety without increasing the size. Additionally, since size reduction and increase of the output are possible, the battery can be used suitably for electric power supplies for electric automobiles having limited mounting space. The secondary battery of the present invention can also be used not only as electric power supplies for electric automobiles exclusively driven by electric energy, but also as electric power supplies for so-called hybrid automobiles in which a combustion engine such as a gasoline engine or diesel engine is used in combination.

(2) Cathode Active Material for Nonaqueous Electrolyte Secondary Battery

The cathode active material for a nonaqueous electrolyte secondary battery according to the present invention (hereinafter, referred to as cathode active material of the present invention) is suited as a material for positive electrodes of nonaqueous electrolyte secondary batteries as described above.

The cathode active material of the present invention includes lithium nickel composite oxide particles represented by the general formula (II):

$$Li_tNi_{1-x-y}Co_xM_yO_2 \qquad (II)$$

where: $0.95 \le t \le 1.15$; $0 \le x \le 0.22$; $0 \le y \le 0.15$; $x+y<0.3$; and M is at least one additional element selected from the group consisting of Mg, Al, Ca, Ti, V, Cr, Mn, Zr, Nb, Mo and W.

A crystal structure of the cathode active material of the present invention is not particularly limited, however in view of insertion and extraction of Li, it is preferable to have a hexagonal crystal structure having a layer structure of the lithium nickel composite oxide that is generally used as a cathode active material.

(Particle Size Distribution)

As for the cathode active material of the present invention, a value represented by the expression of: [(d90−d10)/average particle diameter] as a marker indicating spreading of the particle size distribution is adjusted to 0.65 or less.

The broad particle size distribution suggests that fine particles having a very small particle diameter with respect to the average particle diameter, and particles having a very large particle diameter with respect to the average particle diameter (large-diameter particle) are present in a large number in the cathode active material. When a positive electrode is formed with a cathode active material including a large number of fine particles, the safety is reduced due to heat generation resulting from a local reaction of the fine particles and the fine particles selectively deteriorate, thus leading to inferior cycle characteristics. On the other hand, when a positive electrode is formed with a cathode active material including a large number of large-diameter particles, the area for the reaction between the electrolytic solution and the cathode active material may not be provided sufficiently due to increase of the reaction resistance to lower the battery output.

In contrast, since, according to the present invention, a value represented by the expression of: [(d90−d10)/average particle diameter] as a marker indicating spreading of the particle size distribution of the cathode active material is adjusted to 0.65 or less, the proportion of the fine particles and the large-diameter particles becomes so low that excellent safety, favorable cycle characteristics and battery output can be achieved according to the battery in which this cathode active material is used for the positive electrode.

A smaller value represented by the expression of: [(d90−d10)/average particle diameter] as a marker indicating spreading of the particle size distribution of the cathode active material is more advantageous in improving a performance of the cathode active material. In the case of the obtained cathode active material according to the present invention, however, a lower limit thereof is preferably on the order of 0.05.

It is to be noted that in the value represented by the expression of [(d90−d10)/average particle diameter] as a marker indicating spreading of the particle size distribution, when the numbers of particles of each particle diameter are accumulated from those of the smaller particle diameter, "d10" means a particle diameter in which an accumulated volume thereof accounts for 10% of the total volume of all the particles. Further, when the numbers of particles of each particle diameter are accumulated from those of the smaller particle diameter, "d90" means a particle diameter in which the accumulated volume thereof accounts for 90% of the total volume of all the particles.

While methods for determining the average particle diameter, the "d90" and the "d10" are not particularly limited, for example, the average particle diameter (accumulated volume of 50%), the "d90" and the "d10" can be determined from volume-integrated values measured with a laser diffraction scattering type particle size analyzer.
(Average Particle Diameter)

The cathode active material of the present invention has an average particle diameter of 2 to 8 µm, preferably 3 to 8 µm, and more preferably 3 to 6 µm. When the average particle diameter is less than 2 µm, packing density of the particles is decreased upon formation of the positive electrode to result in lowering of the battery capacity per volume of the positive electrode. When the average particle diameter exceeds 8 µm, the specific surface area of the cathode active material is decreased to result in decrease of a contact area between the cathode active material and the electrolytic solution of the battery. The positive electrode resistance is therefore increased to decrease the output characteristics of the battery.

Accordingly, the battery in which the cathode active material of the present invention having the above average particle diameter is used for the positive electrode can have a greater battery capacity per volume, and excellent battery characteristics such as superior safety and high power.
(Area for Reaction)

In the cathode active material of the present invention, a value represented by an expression of [specific surface area×average particle diameter] as a marker indicating a size of the area for reaction is 5.5 or more, preferably 6 or more. When the value represented by the expression of [specific surface area×average particle diameter] is 5.5 or more, an enough size of the area for reaction between the cathode active material and the electrolytic solution can be obtained. Therefore, the battery for which the positive electrode formed with the cathode active material is used is preferred because the battery with high power can be provided. In general, a specific surface area is in inverse proportion to an average particle diameter. That is, a particle with a small particle diameter has a large specific surface area, while a particle with a large particle diameter has a small specific surface area. The marker reflects a substantial area for reaction according to smoothness and porosity of a surface of a particle independent of the particle diameter, and indirectly indicates reactivity upon reaction between the cathode active material and the electrolytic solution in the battery.

A larger value represented by the expression of [specific surface area×average particle diameter] is more advantageous in improving a performance of the cathode active material. However, an upper limit thereof is preferably on the order of 20 in the cathode active material obtained according to the present invention.
(Inner Structure of Paticles)

The specific surface area of the cathode active material can be increased by increasing asperities on the surface of the particle, making the particle have a porous structure, making the particle hollow, and the like. However, hollow particles are advantageous in stabilizing the specific surface area because an influence of calcinating conditions in the step of producing the cathode active material particles, which is exerted upon the specific surface area can be reduced.

Accordingly, the cathode active material of the present invention preferably includes hollow particles each having an outer shell portion formed with the primary particles and hollow space surrounded by the outer shell portion. With the structure, a path communicating between the hollow space and an outside of the particles is formed between grain boundaries of the primary particles in the outer shell portion. This causes the electrolytic solution to infiltrate via the path between grain boundaries into the hollow space, allowing insertion and extraction of lithium not only at reactive interfaces of outer surfaces of the particles but also at reactive interfaces of surfaces of the primary particles inside the particles surrounding the hollow space. Accordingly, an enough size of the area for reaction between the cathode active material and the electrolytic solution can be obtained: therefore, the battery for which the positive electrode formed with the cathode active material is used is preferred because the battery with high power can be provided.

As for the hollow particles in the cathode active material of the present invention, an average thickness of the outer shell portions is preferably 0.3 to 3 µm, more preferably 0.3 to 2 µm at cross sections of the particles. When the average thickness of the outer shell portions falls within the above range, strength of the particles can be maintained and the space in the central portions can be ensured, thereby being able to maintain the specific surface area of the particles large. The thickness of the outer shell portions is also preferably 10 to 45% in terms of proportion with respect to the particle diameter of the cathode active material particles. When the thickness of the outer shell portions becomes too thin, the strength of the cathode active material particles decreases to result in production of fine particles due to breakage of the particles at the time of handling powder and applying the cathode active material particles to the positive electrode of the battery, leading to deterioration of the characteristics. On the other hand, the thickness of the outer shell portions becomes too thick, an amount of the electrolytic solution is reduced at the grain boundaries or in space where the electrolytic solution can infiltrate into the hollow portions inside the particles. This causes surface area contributing battery reaction to be reduced, resulting in increasing a positive electrode resistance and reducing output characteristics. The thickness of the outer shell portions is therefore preferably 10 to 45%, more preferably 15 to 35% in terms of proportion with respect to the particle diameter of the cathode active material particles.

The average thickness of the outer shell portions of the hollow particles can be measured by observing a cross section of the particle using a scanning electron microscope. For example, a plurality of the particles are embedded into a resin or the like to be subjected to a treatment using a cross section polisher or the like, thereby allowing the observation of the cross sections of particles. A particle whose cross section obtained around the central portion can be observed is then selected from the particles in the resin for measuring a shortest direct distance between an outer surface side and a side of space in the central portion at any of three or more points of the outer shell portion. This derives the average thickness of the outer shell portion of the particle. Ten or more particles are subjected to the measurement for averaging the average thickness of the outer shell portions of respective particles, thereby being able to obtain the average thickness of the outer shell portions as the cathode active material.
(Composition of Particles)

In the cathode active material of the present invention, an atomic ratio t of lithium falls within a range of 0.95 to 1.15 in the general expression (II). When the proportion of lithium is below the above range, the reaction resistance of the positive electrode in the nonaqueous electrolyte secondary battery with the cathode active material becomes so large that the battery output is decreased. When the atomic ratio t of lithium is beyond the above range, the initial discharge capacity of the cathode active material is decreased to increase the reaction resistance of the positive electrode. The atomic ratio t of lithium is therefore preferably 1.0 to 1.15.

It should be noted that in the cathode active material of the present invention, a composition not including cobalt is acceptable. However, for achieving favorable cycle characteristics, it is preferable to include cobalt in the cathode active material because expansion-contraction behavior of a crystal lattice that occurs due to desorption/insertion of Li accompanying with charge and discharge can be reduced by substituting cobalt for a part of Ni in the crystal lattice. In view of these circumstances, an atomic ratio x of cobalt is 0 to 0.22, preferably 0.08 to 0.20, and more preferably 0.12 to 0.20. Additionally, in view of battery capacity and output characteristics, an atomic ratio of nickel to cobalt (Ni/Co) is preferably 0.75/0.25 to 0.9/0.1, more preferably from 0.8/0.2 to 0.85/0.15, and particularly preferably 0.82/0.15.

Additionally, as represented by the above general formula (II), it is more preferred that the cathode active material of the present invention contains an additional element. This is because durability and output characteristics of a battery can be improved when the cathode active material of the present invention is used for the battery.

Since a small amount of the additional element can improve durability and output characteristics of the battery as well as inhibit reduction of the capacity, the additional element is preferably uniformly distributed on the surfaces or inside of the lithium nickel composite oxide particles.

Additionally, in order to improve durability and output characteristics of the battery as well as inhibit reduction of the capacity in a smaller additive amount, it is preferred that an amount of the additional element on the surfaces of the lithium nickel composite oxide particles is larger than those of the particles thereinside.

When an atomic ratio y of the additional element M exceeds 0.15, the battery capacity is unpreferably lowered due to reduction of metal elements that are responsible for a Redox reaction. Although a lower limit of the atomic ratio y of the additional element M is 0, it is preferably 0.001 or more in view of inhibiting reduction of the capacity, as well as improving durability and output characteristics of the battery in a small amount.

(Method for Producing Cathode Active Material for Non-aqueous Electrolyte Secondary Battery)

The method for producing a cathode active material of the present invention is not particularly limited as long as the cathode active material can be produced so as to give the aforementioned average particle diameter, particle size distribution, area for reaction, inner structure of the particle and composition. However, to employ the following method is preferred because the cathode active material of the present invention can be produced more certainly.

Figure 3:
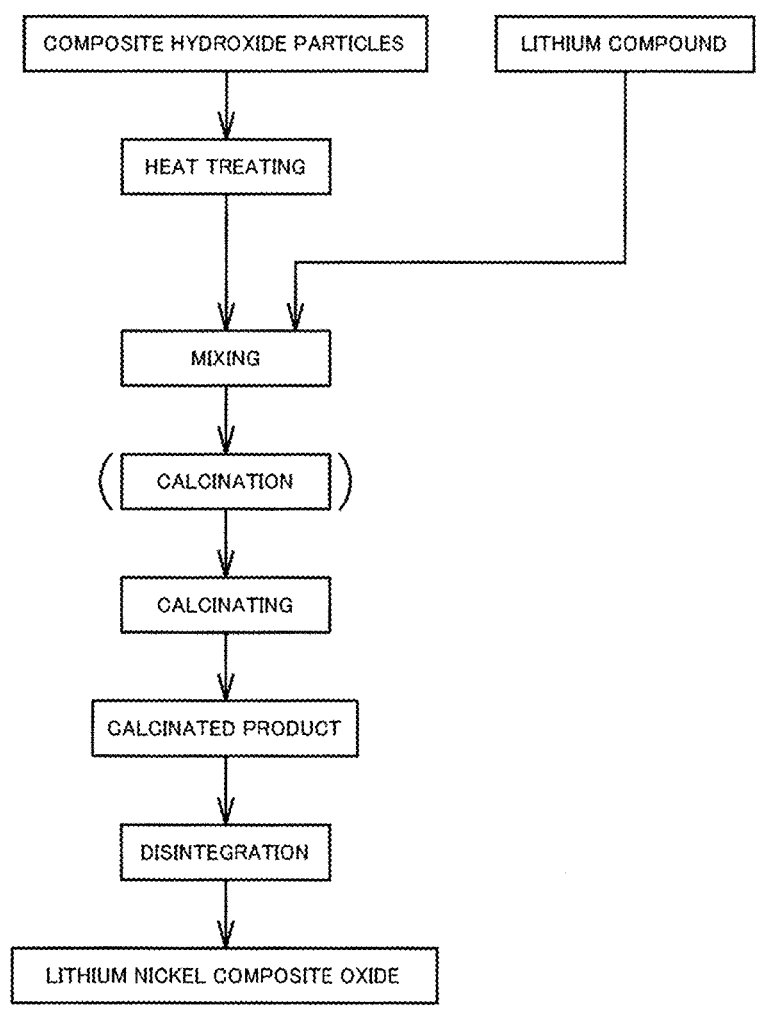
FIG. 3 is a schematic flow chart illustrating steps of producing a lithium nickel composite oxide from the nickel composite hydroxide of the present invention.

The method for producing the cathode active material of the present invention includes, as shown in FIG. 3, a) a step of subjecting the nickel composite hydroxide particles used as a raw material of the cathode active material of the present invention to a heat treatment; b) a mixing step of forming a lithium mixture by mixing a lithium compound with the particles after the heat treatment; and c) a calcinating step of calcinating the lithium mixture prepared in the mixing step. Thereafter, lithium nickel composite oxide particles, namely the cathode active material of the present invention can be obtained by disintegrating a baked product.

The disintegration refers to an operation of applying mechanical energy to aggregates of a plurality of secondary particles generated by sinter necking or the like among secondary particles during the calcinating, thereby decomposing the secondary particles to loosen the aggregates almost without breaking the secondary particles.

Hereinafter, each step is described.

a) Heat Treatment Step

The heat treatment step is a step of subjecting the nickel composite hydroxide particles (hereinafter, merely referred to as composite hydroxide particles) to a heat treatment by heat treating to remove moisture contained in the composite hydroxide particles. By performing this heat treatment step, the remaining moisture in the composite hydroxide particles until the calcinating step can be decreased. In other words, since the composite hydroxide particles can be converted into composite oxide particles according to the heat treatment, variation of the ratio of the number of atoms of metals and the ratio of the number of atoms of lithium in the cathode active material to be produced can be prevented.

It is not necessary that all the composite hydroxide particles are not necessarily converted into the composite oxide particles. The removal of the moisture should just be a grade which variation does not produce in the ratio of the number of atoms of the metals and the ratio of the number of atoms of lithium in the cathode active material.

In the heat treatment step, the composite hydroxide particles may be heated up to a temperature causing the residual moisture to be removed. The temperature of the heat treatment is not particularly limited but is preferably 105 to 800° C. For example, when the composite hydroxide particles are heated to 105° C. or more, the residual moisture can be removed. With the temperature of the heat treatment of less than 105° C., a long time period is required for removing the residual moisture. The temperature of the heat treatment higher than 800° C. may cause aggregation by sintering of the particles that have been converted into the composite oxide.

While an atmosphere in which the composite hydroxide particles are heat treated is not particularly limited, an air atmosphere in which the heat treatment can be simply performed is preferred.

Additionally, the heat treatment time period of the composite hydroxide particles varies depending on the temperature of the heat treatment and is not particularly determined, but is preferably at least 1 hour or longer, and more preferably 5 to 15 hours because there may be a case of not sufficiently removing the residual moisture in the composite hydroxide particles with the heat treatment time period of less than 1 hour. Equipment used for the heat treatment of the composite hydroxide particles is not particularly limited, and any equipment enabling the composite hydroxide particles to be heated in the airflow is acceptable. For example, an air dryer or an electric furnace not accompanied by gas generation may be used.

b) Mixing Step

The mixing step is a step of obtaining a lithium mixture by mixing the particles obtained by heat treating the composite hydroxide in the heat treatment step (hereinafter, referred to as heat treated particles) with a lithium compound.

The heat treated particles refer to nickel composite hydroxide particles after removing the residual moisture in the heat treatment step, as well as nickel composite oxide particles converted into an oxide in the heat treatment step or mixed particles thereof.

A ratio of the number of atoms of lithium (Li) to the numbers of atoms of metal other than lithium in the lithium mixture, namely a ratio of the number of atoms of lithium to the sum of the numbers of atoms of nickel, cobalt and additional elements (Me) (hereinafter, referred to as "Li/

Me") is preferably 0.95/1 to 1.15/1, more preferably 1/1 to 1.15/1, and furthermore preferably 1/1 to 1.10/1. More specifically, the mixing is performed such that Li/Me in the lithium mixture becomes the same as Li/Me in the cathode active material of the present invention. Since the Li/Me is unchanged before and after the calcinating step, Li/Me mixed in this mixing step corresponds to Li/Me in the cathode active material.

Accordingly, the lithium compound and the heat treated particles are mixed such that the Li/Me is preferably 0.95/1 to 1.15/1, more preferably 1/1 to 1.15/1, and furthermore preferably 1/1 to 1.10/1.

The lithium compound used for preparing the lithium mixture is preferably lithium hydroxide, lithium nitrate or lithium carbonate, or a mixture thereof in view of favorable availability. Considering ease in handling and stability of the quality, lithium hydroxide is more preferable.

The lithium mixture and the heat treated particles are preferably mixed sufficiently before calcinating. When the mixing is not sufficient, it is probable to cause problems such as variation of Li/Me among individual particles, and failure in achieving sufficient battery characteristics.

Further, a general mixer may be used for the mixing. Examples of a mixer include a shaker mixer, Loedige mixer, JULIA mixer, V blender. The mixer may be used to sufficiently mix the heat treated particles with the lithium compound to the extent that external shape of the composite hydroxide particles and the like is not broken.

c) Calcinating Step

The calcinating step is a step of calcinating the lithium mixture obtained in the above mixing step to from a lithium nickel composite oxide. When the lithium mixture is calcinated in the calcinating step, lithium in the lithium compound is diffused in the heat treated particles, whereby the lithium nickel composite oxide is formed.

(Calcinating Temperature)

The calcinating temperature of the lithium mixture is 700 to 850° C., and preferably 720 to 820° C.

When the calcinating temperature is less than 700° C., lithium fails to sufficiently diffuse in the heat treated particles, and thus excessive lithium and unreacted particles remain, and/or the crystal structure is not regulated satisfactorily, leading to failure in achieving sufficient battery characteristics. Additionally, when the calcinating temperature exceeds 850° C., sintering occurs drastically among the heat treated particles, and there is a possibility of generating abnormal particles. Accordingly, coarse particles may be formed after the calcinating, and there is a possibility of failure in maintaining the particle shape (shape of spherical secondary particles described later). Thus, the specific surface area is decreased to increase the positive electrode resistance, leading to a decrease of the battery capacity when the cathode active material is formed.

(Calcinating Time Period)

The calcinating time period of the lithium mixture, namely a retention time at the calcinating temperature is preferably 3 hours or more, and more preferably, 6 to 24 hours. When the calcinating time period is less than 3 hours, generation of the lithium nickel composite oxide may be insufficient.

(Calcination)

When a lithium hydroxide, lithium carbonate or the like is used as the lithium compound, it is preferable to perform calcination at a temperature lower than the calcinating temperature, as well as at a temperature where the lithium compound such as a lithium hydroxide or lithium carbonate and heat treated particles can react each other, before calcinating at a temperature of 700 to 850° C. By keeping the lithium mixture at such a temperature, diffusion of lithium in the heat treated particles can be sufficiently performed; therefore, a uniform lithium nickel composite oxide can be obtained. For example, when a lithium hydroxide is used, the calcination is preferably performed at a temperature of 400 to 550° C. for about 1 to 10 hours.

When, as described above, the concentration of the additional element M on the surfaces of the lithium nickel composite oxide particles is increased, the heat treated particles uniformly covered with the additional element on the particle surfaces thereof may be used. By calcinating the lithium mixture containing such heat treated particles under an appropriate condition, the concentration of the additional element on the surfaces of the composite oxide particles can be increased. Specifically, when the lithium mixture containing the heat treated particles covered with the additional element is calcinated at a lower calcinating temperature for a shorter calcinating time period, lithium nickel composite oxide particles having a higher concentration of the additional element M on the surfaces of the particles can be obtained.

In the case where the lithium mixture containing the heat treated particles covered with the additional element is calcinated at a higher calcinating temperature for a longer calcinating time period, lithium nickel composite oxide particles having the additional element uniformly distributed in the heat treated particles can be obtained. In other words, the lithium nickel composite oxide particles as intended can be obtained by adjusting the composition of heat treated particles as a raw material and calcinating conditions.

(Calcinating Atmosphere)

An atmosphere in calcinating the lithium mixture is preferably an oxidizing atmosphere, and more preferably an atmosphere of 18 to 100% by volume of the oxygen concentration. When the oxygen concentration is less than 18% by volume, the nickel composite hydroxide particles included in the heat-treated particles cannot be sufficiently oxidized, and thus crystallinity of the lithium nickel composite oxide may not be sufficient. Calcinating the lithium mixture is therefore preferably performed in an ambient air or an oxygen flow. Considering the battery characteristics, the lithium mixture is preferably calcinated in an oxygen flow.

A furnace used in the calcinating is not particularly limited, and any furnace enabling the lithium mixture to be heated in an ambient air or oxygen flow is acceptable. An electric furnace not accompanied by gas generation is preferable among furnaces, and either one of batch type or continuous type furnace may be used.

(Washing with Water)

When a mixture ratio of the lithium compound with respect to the heat treated particles is increased higher than a stoichiometric ratio, the lithium compound may remain on the surfaces of the lithium nickel composite oxide particles after the calcinating. In order to remove the excessive remaining lithium compound, the lithium nickel composite oxide particles are preferably washed with water after the calcinating. If the excessive lithium compound remains on the surfaces of the lithium nickel composite oxide particles, when a positive electrode of the cathode active material formed with these lithium nickel composite oxide particles is used for a nonaqueous secondary battery, a side reaction may be caused in the nonaqueous secondary battery, becoming a cause of expansion of the battery due to a gas generation. This may lead to failure in safety.

While a method for the above water washing is not particularly limited, the washing can be performed by mixing the lithium nickel composite oxide with water to form water-washed slurry and then stirring the water-washed slurry, followed by filtration and drying.

Concentration of the water-washed slurry is preferably adjusted to 500 g/L to 2500 g/L in the above water washing. When the concentration of the slurry is less than 500 g/L, excessive lithium is eluted from the lithium nickel composite oxide particles, so that the electric characteristics of the cathode active material for a nonaqueous electrolyte secondary battery may deteriorate. On the other hand, when the concentration of the slurry exceeds 2500 g/L, a viscosity of the water-washed slurry becomes too high to be uniformly stirred, not providing a sufficient effect.

Further, the particles after being washed with water and filtered can be dried by a general drying method under a general condition. Vacuum drying or the like may be employed.

(3) Nickel Composite Hydroxide Particles

A nickel composite hydroxide used for the nickel composite hydroxide particles of the present invention (hereinafter, merely referred to as composite hydroxide particles of the present invention) is represented by the general formula (I):

$$Ni_{1-x-y}Co_xM_y(OH)_{2+\alpha} \quad (I)$$

where $0 \leq x \leq 0.22$; $0 \leq y \leq 0.15$; $x+y<0.3$; $0 \leq \alpha \leq 0.5$; and M is at least one additional element selected from the group consisting of Mg, Al, Ca, Ti, V, Cr, Mn, Zr, Nb, Mo and W. The composite hydroxide particles of the present invention are spherical secondary particles formed by aggregation of a plurality of primary particles.

The composite hydroxide particles of the present invention are particularly suitable for a raw material of the aforementioned cathode active material of the present invention. Accordingly, the composite hydroxide particles of the present invention is described below on the precondition that the composite hydroxide particles are used for a raw material of the cathode active material of the present invention.

(Average Particle Diameter)

Since the composite hydroxide particles of the present invention have an average particle diameter of 2 to 7 μm, the cathode active material prepared using the composite hydroxide particles of the present invention as a raw material generally has a predetermined average particle diameter of 2 to 8 μm. When the composite hydroxide particles of the present invention have an average particle diameter of less than 2 μm, the cathode active material also has a small average particle diameter, whereby the packing density of the positive electrode is decreased to result in lowering of the battery capacity per volume. To the contrary, when the composite hydroxide particles of the present invention have a average particle diameter of greater than 7 μm, the specific surface area of the obtained cathode active material is reduced to result in reduction of the contact area between the cathode active material and the electrolytic solution, whereby the positive electrode resistance is increased to decrease the output characteristics of the battery. Since the composite hydroxide particles of the present invention have the predetermined average particle diameter, when a battery is provided with a positive electrode formed with the cathode active material of the present invention prepared with the composite hydroxide particles as a raw material, excellent battery characteristics can be achieved.

(Particle Size Distribution)

The composite hydroxide particles of the present invention are adjusted to have a value represented by the expression of: [(d90−d10)/average particle diameter] as a marker indicating spreading of the particle size distribution of 0.55 or less. Since the particle size distribution of the cathode active material is significantly affected by the composite hydroxide particles of the raw material, contamination of fine particles or coarse particles in the composite hydroxide particles leads to the presence of similar particles also in the cathode active material. Accordingly, when the value represented by the expression of: [(d90−d10)/average particle diameter] exceeds 0.55, fine particles or coarse particles are present also in the cathode active material. Since the value represented by the expression of: [(d90−d10)/average particle diameter] is adjusted to 0.55 or less in the composite hydroxide particles of the present invention, the cathode active material prepared using the composite hydroxide particles of the present invention as a raw material can have a narrow range of the particle size distribution, and uniform particle diameters. Thus, the marker of the resulting cathode active material of [(d90−d10)/average particle diameter] can be 0.65 or less. Accordingly, the battery having an electrode formed with the cathode active material prepared using the composite hydroxide particles of the present invention as a raw material can be provided as a battery having favorable cycle characteristics and output.

(Particle Structure)

The composite hydroxide particles of the present invention are the secondary particles each having a central portion and an outer shell portion formed outside the central portion. The central portion of the composite hydroxide particle is formed with primary particles finer than those of the outer shell portion ranged randomly, providing a structure with large space inside thereof. On the other hand, the outer shell portion is formed with platy primary particles larger than the primary particle of the central portion.

The inner structure of the composite hydroxide particles is maintained in the case where the composite hydroxide particles are heat treated in the air to obtain heat treated particles.

When the heat treated particles are mixed with a lithium compound, followed by calcinating, reaction with the lithium compound starts from the outer shell portions of the particles, and lithium diffuses from the outer shell portions to the inside thereof, as well as a reaction simultaneously occurs for growing a crystal. In the course of this process, a mass transfer occurs such that crystal growing from the outside absorbs fine primary particles of the central portions with low density, and a reaction with lithium occurs. This forms space inside the central portions.

Accordingly, if the composite hydroxide particles have the central portions and the outer shell portions as described above, an area for reaction with the electrolytic solution can be sufficiently increased in the cathode active material obtained by calcinating the composite hydroxide particles. Therefore, a battery for which the positive electrode formed with the cathode active material is used is preferred because a battery with high power can be provided.

In the composite hydroxide particles having the above structure, an average thickness of the outer shell portions is preferably 0.3 to 3 μm, more preferably 0.5 to 2 μm. A thickness of the outer shell portions is also preferably 10 to 45% in terms of proportion with respect to the particle diameter of the composite hydroxide particles. A shrinkage of the outer shell portion in the nickel composite hydroxide particle is small even when being calcinated. The average thickness of the outer shell portions in the composite hydroxide particles is maintained approximately equal to that of in the cathode active material particles after the calcinating, although the average thickness becomes slightly thinner.

The average thickness of the outer shell portions of the composite hydroxide particles can be measured by the same method as that used for measuring the average thickness of the outer shell portions of the cathode active material particles (see, paragraph 0057).

In order to obtain the cathode active material having hollow space inside the particles by calcinating the composite hydroxide particles of the present invention, the primary particles of the central portion of the composite hydroxide particle preferably have an average particle diameter of 0.3 μm or less, more preferably 0.1 μm or less. When the primary particles of the central portion have the average particle diameter over 0.3 μm, a mass transfer to the outer shell portion is not likely to occur at the time of reaction with lithium, leading to a possibility of failure in obtaining sufficiently large space inside the particle after the calcinating. While a lower limit of the average particle diameter is not particularly limited, the lower limit of the average particle diameter is on the order of 0.005 μm under a condition of the production method according to the present invention.

Also, the platy primary particles of the outer shell portion of the composite hydroxide particle preferably have an average particle diameter of 0.3 to 3 μm, more preferably 0.5 to 1.5 μm. When the platy primary particles of the outer shell portion have the average particle diameter of less than 0.3 μm, an outer shell portion with high density cannot be formed. On the other hand, when the average particle diameter exceeds 3 μm, maintaining the spherical shape of the secondary particles becomes unpreferably difficult.

In each of the composite hydroxide particles, a particle diameter of the primary particles forming the central portion and a particle diameter of the platy primary particles forming the outer shell portion can be measured by observing a cross section of each composite hydroxide particle using a scanning electron microscope similarly to the case of measuring the thickness of the outer shell portions of the cathode active material (see, paragraph 0057). That is, the composite hydroxide particle whose cross section can be observed is observed, and at the cross section, a maximum particle diameter is measured as a particle diameter of each primary particle with respect to the plurality of primary particles forming the central portion and the outer shell portion of the composite hydroxide particle, followed by calculating an average value of particle diameters of the plurality of primary particles. This enables to obtain the particle diameter of primary particles of the central portion and the outer shell portion in each composite hydroxide particle.

Further, a shape of the primary particles forming the central portion in the composite hydroxide particle is not particularly limited, however, a platy shape and/or a needle shape is preferred. Since the central portion is likely to have low density with the shape of the primary particles forming the central portion, the outer shell portion absorbs the central portion at the time of calcinating. This enables to produce sufficient amount of space inside the calcinated cathode active material particles.

The outer shell portion of the composite hydroxide particle according to the present invention is preferably formed by aggregating platy primary particles in random directions. When the platy primary particles are aggregated in random directions, voids are generated almost uniformly among the primary particles, and thus when calcinated after mixing with the lithium compound, molten lithium compound distributes over the secondary particles to sufficiently accomplish the diffusion of lithium.

(Composition of Particles)

The composite hydroxide particles of the present invention have the composition represented by the general formula (I). By using the composite hydroxide particles of the present invention, a composite hydroxide suitable for a raw material in producing a composite oxide of a cathode active material can be formed. Thus, when this composite hydroxide is used as a raw material to produce a lithium nickel composite oxide, by employing an electrode produced using this lithium nickel composite oxide as a cathode active material in a battery, a resistance value of the positive electrode to be measured can be reduced, whereby favorable output characteristics of the battery can be achieved.

Additionally, when a cathode active material is produced according to the production method described above, the composition ratio (Ni:Co:M) of the composite hydroxide particles of the present invention can be maintained also in the cathode active material.

Therefore, the composition ratio of the composite hydroxide particles of the present invention is preferably adjusted so as to be similar to that of the cathode active material as intended.

(Method for Producing Nickel Composite Hydroxide Particles)

A method for producing the composite hydroxide particles of the present invention includes:

a) a nucleation step of producing nuclei by controlling a pH of an aqueous reaction solution (aqueous solution for nucleation) to 11.5 to 13.2 at a liquid temperature of 25° C. as a standard, the aqueous reaction solution containing a metal compound having an atomic ratio of metals corresponding to an atomic ratio of metals in the nickel composite hydroxide particles and substantially not containing a metal complex ion-forming agent; and b) a particle growth step of growing the nuclei by controlling a pH of an aqueous reaction solution (aqueous solution for particle growth) containing the nuclei obtained in the nucleation step to 9.5 to 11.0 at a liquid temperature of 25° C. as a standard.

According to the method for producing the composite hydroxide particles of the present invention, the nucleation reaction and the particle growth reaction do not proceed in the same vessel at the same time as in conventional continuous precipitation methods. The present method is characterized by definite separation of the time period during which the nucleation reaction mainly occurs (nucleation step), and the time period during which the particle growth reaction mainly occurs (particle growth step).

An outline of the method for producing the composite hydroxide particles of the present invention is first described with reference to FIG. 1. It should be noted that in FIGS. 1 and 2, the nucleation step is illustrated in (A), whereas the particle growth step is illustrated in (B).

(Nucleation Step)

In the nucleation step, as shown in FIG. 1, an aqueous solution for nucleation containing a metal compound having an atomic ratio of metals corresponding to an atomic ratio of metals in the nickel composite hydroxide particles represented by the general formula (I) and substantially not containing a metal complex ion-forming agent is prepared for producing nuclei therein. The aqueous solution for nucleation is prepared by mixing a mixed aqueous solution and an aqueous solution before the reaction.

As shown in FIG. 1, a plurality of metal compounds including nickel are dissolved first in water at a predetermined ratio to prepare the mixed aqueous solution. At this time, the mixed aqueous solution is prepared by adjusting the ratio of the metal compounds to be dissolved in water such that the atomic ratio of each metal in the mixed aqueous solution becomes the same atomic ratio of metal in the nickel composite hydroxide particles represented by the general formula (I).

On the other hand, in the reaction vessel, an alkaline aqueous solution such as an aqueous sodium hydroxide solution and water are supplied and mixed to give the aqueous solution before the reaction.

This aqueous solution before the reaction is adjusted to have a pH thereof falling within the range of 11.5 to 13.2 in terms of pH as measured at a liquid temperature of 25° C. by adjusting an amount of supplied alkaline aqueous solution. Further, the temperature of the aqueous solution before the reaction is adjusted to 60° C. or more, more preferably to over 60° C. and not higher than 80° C.

The mixed aqueous solution is supplied to the aqueous solution before the reaction whose temperature and pH is adjusted in the reaction vessel while the aqueous solution before the reaction is stirred. Since the aqueous solution before the reaction is adjusted to have a pH thereof falling within the range of 11.5 to 13.2 in terms of pH as measured at the liquid temperature of 25° C. as described above, when the aqueous solution before the reaction is mixed with the mixed aqueous solution, the aqueous solution for nucleation is formed and fine nuclei of the composite hydroxide are produced in the aqueous solution for nucleation. At this time, the pH of the aqueous solution for nucleation falls within the above range; therefore, the produced nuclei hardly grow, and nucleation occurs preferentially.

Since the nucleation is accompanied by change in the pH of the aqueous solution for nucleation during the nucleation step, the mixed aqueous solution and the alkaline aqueous solution are supplied to the aqueous solution for nucleation to maintain the pH of the aqueous solution for nucleation at a predetermined value.

As described above, when the mixed aqueous solution and the alkaline aqueous solution are successively supplied to the aqueous solution for nucleation, production of additional nuclei persists continuously in the aqueous solution for nucleation. Subsequently, when the nuclei are produced by a predetermined amount in the aqueous solution for nucleation, the nucleation step is terminated. Whether or not the nuclei have been produced by a predetermined amount may be determined based on the amount of the metal compound added to the aqueous solution for nucleation.

(Particle Growth Step)

After completing the nucleation step, the produced nuclei in the nucleation step are grown in an aqueous solution for particle growth whose pH is adjusted to 9.5 to 11.0 at a liquid temperature of 25° C. The aqueous solution for particle growth can be obtained by adjusting an amount of the supplied alkaline aqueous solution to the aqueous solution for nucleation after completing the nucleation step and by adjusting the pH to 9.5 to 11.0.

Since the growth reaction of the nuclei preferentially occurs as compared with the production reaction of the nuclei in the aqueous solution for particle growth whose pH is 11.0 or less, additional nuclei are hardly produced in the aqueous solution for particle growth, thereby allowing uniform nuclei with a narrow range of a particle size distribution to be formed.

Further, since the pH and the temperature of the aqueous solution for particle growth are adjusted as described above, and the particle growth step is performed under a condition where solubility of a hydroxide monomer is higher than that of in the nucleation step, a precipitation form of a hydroxide in the particle growth step is different from a precipitation form of a hydroxide in the nucleation step. Therefore, in the particle growth step, precalcinates larger than the primary particles of nuclear particles grow in outer shell portions of the nuclear particles produced in the nucleation step. That is, the composite hydroxide particles formed in the particle growth step are particles each having a central portion and an outer shell portion in which primary particles of the both portions have different particle diameters and shapes, and further different densities.

When the composite hydroxide particles having a predetermined particle diameter are produced only by the predetermined amount, the particle growth step is terminated. The amount of the produced composite hydroxide particles having the predetermined particle diameter may be determined based on the amount of the metal compound added to the aqueous solution for nucleation.

As described above, according to the method for producing the composite hydroxide particles, nucleation occurs preferentially, while growth of nuclei hardly occurs in the nucleation step. On the contrary, only the growth of nuclei occurs, while additional nuclei are hardly produced in the particle growth step. This therefore allows uniform nuclei having a narrow range of the particle size distribution to be formed. Further, in the particle growth step, the nuclei uniformly grow to be able to form particles having precalcinates that are larger than the primary particles of the nuclear particles around the nuclei. Therefore, according to the method for producing the composite hydroxide particles of the present invention, uniform nickel composite hydroxide particles with a narrow range of particle size distribution thereof can be obtained, and further each of the nickel composite hydroxide particles has a central portion and an outer shell portion whose primary particles have different particle diameters and shapes, and further densities.

(Control of Particle Diameter of Composite Hydroxide Particles)

Since the particle diameter of the composite hydroxide particles can be controlled by means of the time period of the particle growth step, composite hydroxide particles having a desired particle diameter can be obtained by continuing the particle growth step until growth to give the desired particle diameter.

Additionally, the particle diameter of the composite hydroxide particles can be controlled not only in the particle growth step, but also by the pH and the amount of the raw material supplied for nucleation in the nucleation step.

That is, the amount of the supplied raw material is increased by adjusting the pH in the nucleation to a higher pH, or by prolonging the time period of the nucleation, whereby the number of the produced nuclei is increased. Thus, also in the case where the particle growth step is performed under the same condition, the particle diameter of the composite hydroxide particles can be reduced.

On the other hand, by controlling the number of nucleation to be reduced, the resulting composite hydroxide particles can have a larger particle diameter.

(Control of Inner Structure of Composite Hydroxide Particles)

The nuclei to be produced in the nucleation step form the central portions of the composite hydroxide particles having such a structure as fine primary particles randomly aggregate. On the other hand, the outer shell portions to be produced in the particle growth step have such a structure as primary particles having a larger particle diameter than the above fine primary particles randomly aggregate. A ratio of the central portion to the outer shell portion inside the particle can be changed depending on a ratio of amounts of raw material supplied in the nucleation step and the particle growth step or a ratio of time periods in respective steps.

Hereinafter, the nucleation step is described in detail.

(A) Metal Compounds

As a metal compound, a metal compound having an atomic ratio of the metals corresponding to the atomic ratio of the metals in the nickel composite hydroxide particles represented by the general formula (I) is used. In order to have an atomic ratio of the metals corresponding to the atomic ratio of the metals in the nickel composite hydroxide particles represented by the general formula (I), the metal compound contains one or at least two metal compounds.

In general, the metal compound is preferably dissolved in water in advance for facilitating the supply to the aqueous solution before the reaction and favorably mixing. Accordingly, the metal compound preferably has water solubility. Note that a solution obtained by dissolving the metal compound in water corresponds to the mixed aqueous solution in FIG. 1.

Example of the metal compound includes inorganic acid salt. In order to have an atomic ratio of the metals corresponding to the atomic ratio of the metals in the nickel composite hydroxide represented by the general formula (I), one or at least two inorganic acid salts are used. Examples of the inorganic acid salt include nitrate, sulfate, and hydrochloride, however, the present invention is not limited to these examples. One alone or at least two in combination selected from these inorganic acid salts may be used. Examples of preferable metal compound include nickel sulfate and cobalt sulfate.

(Additional Element)

In the general formula (I), M represents an additional element. The additional element is at least one element selected from the group consisting of Mg, Al, Ca, Ti, V, Cr, Mn, Zr, Nb, Mo and W. For the compound including the additional element, a water soluble compound is preferably used. Examples of the compound including the additional element include magnesium sulfate, aluminum sulfate, sodium aluminate, titanium sulfate, ammonium peroxotitanate, titanium potassium oxalate, vanadium sulfate, ammonium vanadate, chromium sulfate, potassium chromate, manganese sulfate, zirconium sulfate, zirconium nitrate, niobium oxalate, ammonium molybdate, sodium tungstate, ammonium tungstate. However, the present invention is not limited to these examples.

When such an additional element is uniformly dispersed in the composite hydroxide particles, a compound described above containing the additional element, preferably a water-soluble compound containing the additional element may be added to the mixed aqueous solution. This allows the additional element to be uniformly dispersed in the composite hydroxide particles.

Moreover, when surfaces of the composite hydroxide particles are covered with the additional element, for example, a slurry of the composite hydroxide particles is formed with an aqueous solution containing the compound having the additional element to cause the additional element to precipitate on the surfaces of the composite hydroxide particles by a crystallization reaction. The surfaces thereof can therefore be covered with the additional element. In this case, an alkoxide solution containing the compound having the additional element may be used instead of the aqueous solution containing the compound having the additional element. Further, the surfaces of the composite hydroxide particles can be covered with the additional element by spraying an aqueous solution or slurry containing the compound having the additional element onto the composite hydroxide particles followed by drying.

When the surfaces of the composite hydroxide particles are covered with the additional element, by reducing the ratio of the number of atoms of metal in the compound containing the additional element present in the mixed aqueous solution by the amount just required for the covering, agreement with the ratio of the number of atoms of the metal in the composite hydroxide particles can be achieved.

Further, the step of covering the surfaces of the composite hydroxide particles with the additional element may be performed to the particles after heat treating the composite hydroxide particles, namely to the heat treated particles described above.

(B) Preparation of Aqueous Solution for Nucleation

The aqueous solution for nucleation can be prepared by mixing a plurality of aqueous solutions of metal compounds.

According to the production method of the present invention, a solution substantially not including a complex ion-forming agent that forms a plurality of metal compounds and complex salt is used for the aqueous solution for nucleation. With the aqueous solution for nucleation including the complex ion-forming agent, solubility of nickel and cobalt increases, thereby decreasing a precipitation rate of the composite hydroxide allowing the primary particles to easily grow. Therefore, nuclei obtained by aggregating fine primary particles, namely nuclei of the central portions of secondary particles in the composite hydroxide particles cannot be formed. A typical example of the complex ion-forming agent includes an ammonia ion donor. Additionally, "not substantially including" described above refers to inclusion to the extent of not affecting the solubility of the metal compound in the aqueous reaction solution or less. In an ammonia ion, for example, a concentration that cannot be detected by the general analysis is preferred, however, it may be on the order of 0 to 0.1 g/L.

(C) Concentration of Metal Compound in Aqueous Solution for Nucleation

A concentration of the metal compound in the mixed aqueous solution used for forming the aqueous solution for nucleation is preferably 1 to 2.2 mol/L. Even though the concentration of the metal compound in the mixed aqueous solution is less than 1 mol/L, a crystallization reaction of the composite hydroxide particles is possible, however, productivity is decreased due to reduction of an amount of crystallized products. When the concentration of the mixed aqueous solution exceeds 2.2 mol/L, there is a possibility that piping of the equipment is clogged with precipitated crystal. In the case of using two or more metal compounds, aqueous solutions of respective metal compounds may be used with a predetermined ratio such that the concentration of the metal compounds falls within the predetermined range in the aqueous solution for nucleation by adjusting the aqueous solutions.

An amount of nuclei in the obtained aqueous solution for nucleation is preferably about 30 to 200 g/L. When the amount of the nuclei in the aqueous solution for nucleation is less than 30 g/L, aggregation of the primary particles may not be sufficient. When the amount of the nuclei exceeds 200 g/L, the nuclei may not uniformly grow.

(D) pH of Aqueous Solution for Nucleation

The pH of the aqueous solution for nucleation is controlled to be 11.5 to 13.2 in terms of pH as measured at a liquid temperature of 25° C. Since the pH of the aqueous solution for nucleation is controlled in this manner, only nucleation is substantially allowed by inhibiting particle growth, providing nuclei formed uniformly with a narrow range of particle size distribution.

When the pH is higher than 13.4 at the liquid temperature of 25° C., the primary particles of the nuclei and the nuclei may become too fine, and a problem of gelation of the aqueous reaction solution may occur. In contrast, when the pH is less than 11.5, the growth reaction of the nuclei causes production of large precalcinates along with formation of the nuclei, whereby the primary particles of nuclear particles to be formed are in a form with fine particles and coarse particles mixed. Moreover, the range of particle size distribution of the nuclear particles becomes broad and nonuniform. The pH of the aqueous solution for nucleation therefore is 11.5 to 13.2, preferably 12.0 to 13.0 at the liquid temperature of 25° C. as a standard.

The pH of the aqueous solution for nucleation can be adjusted by a pH regulate agent. Example of the pH regulate agent includes an alkaline aqueous solution such as an aqueous solution of an alkali metal hydroxide such as sodium hydroxide or potassium hydroxide, however, the pH regulate agent of the present invention is not limited to these examples. The pH of the aqueous solution for nucleation can be measured by a pH meter generally used.

The pH regulate agent may be directly added to the mixed aqueous solution, however, to add in the form of an aqueous solution to the aqueous solution for nucleation is preferred because of ease in adjusting the pH of the aqueous solution for nucleation. In the case of adding the pH regulate agent to the aqueous solution for nucleation, the pH regulate agent may be added with a pump that enables the flow rate to be controlled such as a metering pump such that the pH of the aqueous solution for nucleation is maintained within the predetermined range, while stirring the aqueous solution for nucleation.

Since the pH of the aqueous solution for nucleation varies in accordance with the nucleation, the pH of the aqueous solution for nucleation is preferably adjusted to fall within the predetermined range by appropriately adding the pH regulate agent to the aqueous solution for nucleation. For example, as shown in FIG. 1, the pH of the aqueous solution for nucleation can be adjusted to fall within the predetermined range by supplying an alkaline aqueous solution as a pH regulate agent to the aqueous solution for nucleation.

(E) Amount of Nucleation

While the amount of the nuclei produced in the nucleation step is not particularly limited, 0.1 to 5% by mass of the entire metal compounds supplied for obtaining composite hydroxide particles is preferred, and 0.1 to 2.5% by mass is more preferred in view of obtaining composite hydroxide particles having a favorable particle size distribution.

(F) Liquid Temperature of Aqueous Solution for Nucleation

The liquid temperature of the aqueous solution for nucleation is set to be preferably 60° C. or more, more preferably over 60° C. to not higher than 80° C., and furthermore preferably 65 to 80° C. When the temperature of the aqueous reaction solution is less than 60° C., solubility of nickel and cobalt becomes too low due to the low temperature, allowing the nuclei to easily grow, so that control thereof is likely to be difficult. Although the crystallization reaction is possible with the temperature over 80° C., it is not industrially preferred because of increasing cost for maintaining the temperature to be high and the risk in safety.

(G) Atmosphere in Nucleation Step

While an atmosphere in the nucleation step is not particularly limited, excessively oxidizing atmosphere is not preferred in view of stable production of the nuclei. Therefore, as to the atmosphere in the nucleation step, oxygen concentration is preferably lower than oxygen concentration in the air. For example, by performing the nucleation step in the atmosphere with the oxygen concentration in the space within the reaction vessel at 10% by volume or less, unnecessary oxidization of the particles is inhibited, whereby particles having an even particle size can be obtained. In particular, the oxygen concentration is preferably controlled at least in the particle growth step described later.

The oxygen concentration in the atmosphere can be adjusted, for example, by using an inert gas such as nitrogen. Means for adjusting the oxygen concentration in the atmosphere to a predetermined concentration may include allowing an inert gas to constantly flow in the atmosphere.

(I) Production Equipment

In the nucleation step, used is an apparatus employing a system in which a product is not obtained until the reaction is completed. Example of the apparatus includes a batch reaction vessel equipped with a stirrer. When such an apparatus is employed, a problem of obtaining growing particles simultaneously with an overflowed liquid does not occur, as in the case of general continuous precipitation apparatuses in which the product is obtained by overflow. Therefore, particles having a narrow particle size distribution and an even particle diameter can be easily obtained. Additionally, when the reaction atmosphere is controlled, an apparatus in which the atmosphere can be controlled such as enclosed apparatus is preferred as said apparatus. When such an apparatus is used, the nucleation proceeds almost evenly; therefore, particles with excellent particle diameter distribution (namely, particles having a narrow range of particle size distribution) can be obtained.

Next, the particle growth step is described in detail.

(A) pH of Aqueous Solution for Particle Growth

Since the pH of the aqueous solution for particle growth is adjusted to 9.5 to 11.0 in terms of pH as measured at a liquid temperature of 25° C., additional nuclei are hardly produced in the aqueous solution for particle growth.

When the pH of the aqueous solution for particle growth is higher than 11.0 at the liquid temperature of 25° C. as a standard, a probability of generation of additional nuclear particles increases to result in not being able to obtain composite hydroxide particles with favorable particle diameter distribution. On the other hand, when the pH of the aqueous solution for particle growth is less than 9.5 at the liquid temperature of 25° C. as a standard, an amount of metal ions remaining in the liquid without precipitating as a composite hydroxide unpreferably increases because solubility of the metal compound increases. Accordingly, the pH of the aqueous solution for particle growth is 9.5 to 11.0, preferably 9.7 to 10.7 at the liquid temperature of 25° C. as a standard.

(B) Preparation of Aqueous Solution for Particle Growth

In the nucleation step and the particle growth step, since the composite hydroxide is crystallized and the metal components or the like in the aqueous reaction solution decrease, the mixed aqueous solution is supplied to the aqueous reaction solution. When a proportion of water as a solvent with respect to the metal components in the aqueous reaction solution increases, the mixed aqueous solution supplied to the aqueous reaction solution seems to have the concentration apparently decreased. Therefore, there is a possibility of failure in sufficient growth of the composite hydroxide particles in the particle growth step.

In the particle growth step, after completing the nucleation step or during the particle growth step, a part of the aqueous solution for nucleation or the aqueous solution for particle growth is preferably discharged out from the reaction vessel for allowing the composite hydroxide particles to sufficiently grow. More specifically, supply of the mixed aqueous solution and the like to the aqueous reaction solution and stirring of the mixture are stopped to cause the nuclei and composite hydroxide particles to precipitate, and then supernatant of the aqueous reaction solution is discharged. Accordingly, a relative concentration of the mixed aqueous solution in the aqueous solution for particle growth can be increased. Thus, the particle size distribution of the composite hydroxide particles can be more narrowed, as well as the density of the composite hydroxide particles can be increased.

Further, when the pH of the aqueous solution for nucleation after completing the nucleation step is adjusted to form the aqueous solution for particle growth, transfer from the nucleation step to the particle growth step can be rapidly executed. That is, transfer from the nucleation step to the particle growth step can be easily executed by temporarily suspending the usage of the pH regulate agent used for the aqueous solution for nucleation. An inorganic acid such as sulfuric acid, hydrochloric acid, or nitric acid may be used for the pH regulate agent. Among the inorganic acids, the same kind of inorganic acid as an acid of the metal compound as a raw material is preferably used, for example, sulfuric acid is preferably used in the case of using sulfate.

As shown in FIG. 2, in the present invention, an aqueous components-adjusted solution having a pH adjusted to be suitable for the particle growth step is prepared separately from the aqueous solution for nucleation, and an aqueous solution for particle growth is prepared by adding to this aqueous components-adjusted solution an aqueous solution containing the nuclei that have been subjected to the nucleation step in another reaction vessel. The particle growth step is then performed using resulting aqueous solution for particle growth. According to this method, the nucleation step and the particle growth step are separated; therefore, states of the aqueous solution for nucleation and the aqueous solution for particle growth can be adjusted such that a suitable composition for each step can be provided. Also, in the particle growth step, the pH of the aqueous solution for particle growth can be adjusted to be suitable for the particle growth from a time point of starting the particle growth step. Accordingly, the composite hydroxide particles formed in the particle growth step can have a narrow range of the particle size distribution and can be uniform.

Moreover, when the aqueous solution for particle growth is prepared by adjusting the pH of the aqueous solution for nucleation, the particle growth step can be performed subsequently to the nucleation step. Thus, transfer from the nucleation step to the particle growth step can be executed by merely adjusting the pH of the aqueous solution for nucleation.

According to the production method of the present invention, the solution substantially not including a metal complex ion-forming agent that forms a plurality of metal compounds and a complex salt is used as the aqueous solution for nucleation in the nucleation step. In the particle growth step, however, the aqueous solution for particle growth may contain the metal complex ion-forming agent because a particle diameter of the primary particles to be produced becomes larger than that of in the nucleation step. For example, when the aqueous solution for particle growth contains ammonia as the metal complex ion-forming agent, ammonia concentration is preferably maintained at a certain value of 25 g/L or less. With the ammonia concentration over 25 g/L, solubility of the metal ions becomes too large causing the amount of metal ions remaining in the aqueous reaction solution to increase, leading to a probability of a deviation of the composition.

(C) Other Conditions

A difference between the nucleation step and the particle growth step lies in the fact that the pH controlled in the nucleation step is different from that of in the particle growth step. The conditions such as the metal compounds, the reaction temperature and the atmosphere are substantially similar between both steps.

EXAMPLES

Hereinafter, the present invention is specifically described with Examples, but the present invention is not any how limited to these Examples.

Average particle diameters, particle size distributions, specific surface areas, compositions, and shapes of surfaces of composite hydroxides and cathode active materials obtained in Examples and Comparative Examples, and performances of secondary batteries (initial discharge capacity, cycle capacity retention rate, and positive electrode resistance) were evaluated by the following method.

(Measurement of Average Particle Diameter, Particle Size Distribution, Specific Surface Area, Crystal Structure, Composition and Shape of Surface)

Average particle diameters and particle size distributions (a value represented by the expression of: [(d90−d10)/average particle diameter]) of the composite hydroxide and the cathode active material were calculated from the volume-integrated value measured using a laser diffraction scattering type particle size distribution measurement apparatus (Microtrack HRA, manufactured by Nikkiso Co., Ltd.).

A specific surface area was measured by a fluid type gas absorption method specific surface area measurement apparatus (Multisorb, manufactured by Yuasa Ionics, Ltd.).

Further, crystal structures of the composite hydroxide and the cathode active material were ascertained by an X-ray diffraction measurement apparatus (X 'Pert PRO, manufactured by PANalytical Inc.), and the compositions of the obtained composite hydroxide and cathode active material were ascertained by an ICP emission spectroscopy after dissolving a sample of 1 g in pure water of 100 ml.

Furthermore, shapes of the surfaces of the composite hydroxide particles and the composite oxide particles were observed using a scanning electron microscope. An inner structure thereof was also observed by the scanning electron microscope after subjecting cross sections thereof to a treatment using a cross section polisher.

(Evaluation of Performance of Secondary Battery)

For evaluating a performance of the secondary battery, a 2032 type coin battery shown in FIG. 8 (hereinafter, referred to as a coin type battery 1) was used.

Figure 8:
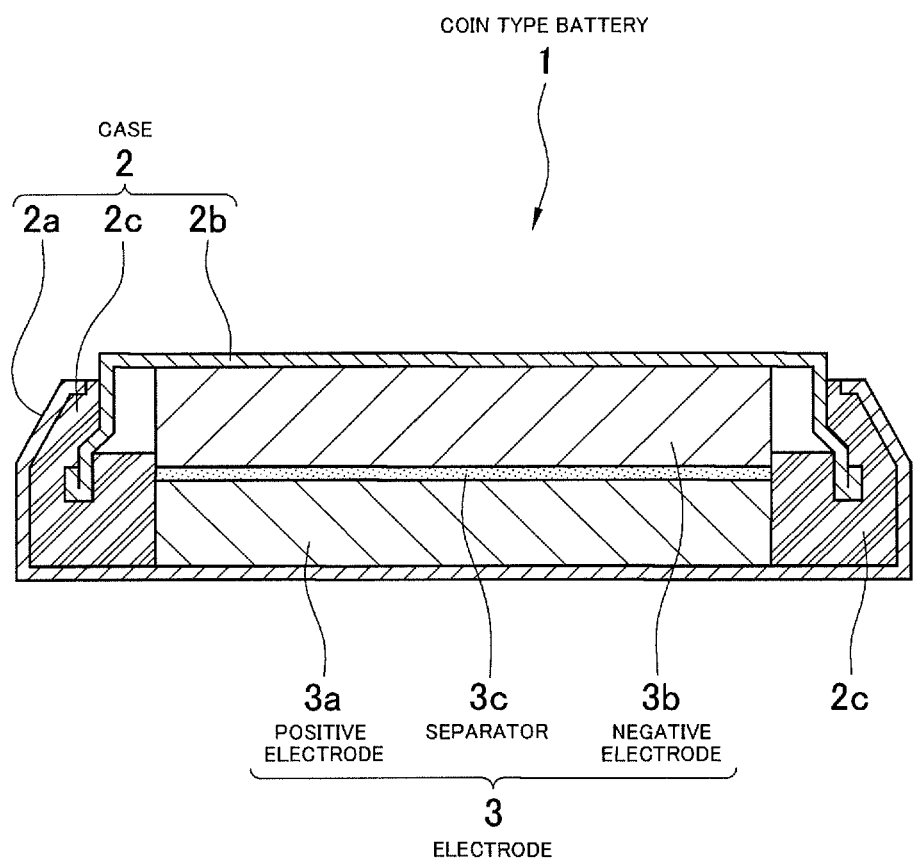
FIG. 8 is a schematic cross sectional view illustrating a coin type battery 1 used for evaluating a battery.

As shown in FIG. 8, the coin type battery 1 includes a case 2 and an electrode 3 housed in this case 2.

The case 2 has a hollow and one-end opened positive electrode can 2*a* and a negative electrode can 2*b* disposed at the opening of this positive electrode can 2*a*. Space for housing the electrode 3 is formed between the negative electrode can 2b and the positive electrode can 2a when the negative electrode can 2b is disposed at the opening of the positive electrode can 2a.

The electrode 3 includes a positive electrode 3a, a separator 3c and a negative electrode 3b, which are laminated in this order. This electrode 3 is housed in the case 2 such that the positive electrode 3a is in contact with an inner face of the positive electrode can 2a and that the negative electrode 3b is in contact with an inner face of the negative electrode can 2b.

The case 2 has a gasket 2c, which fixes relative movement so as to keep an electrical insulation condition between the positive electrode can 2a and the negative electrode can 2b. Additionally, the gasket 2c also has a function to tightly seal a gap between the positive electrode can 2a and the negative electrode can 2b to air-tightly and liquid-tightly block the inside of the case 2 from the exterior.

The coin type battery 1 as described above was produced as in the following.

First, 52.5 mg of a cathode active material for a nonaqueous electrolyte secondary battery, 15 mg of acetylene black, and 7.5 mg of a polytetrafluoroethylene resin (PTFE) were mixed, and the mixture was subjected to press molding at a pressure of 100 MPa to form into a piece having a diameter of 11 mm and a thickness of 100 µm, whereby the positive electrode 3a was produced. The produced positive electrode 3a was then dried in a vacuum drier at 120° C. for 12 hours.

Using this positive electrode 3a, the negative electrode 3b, the separator 3c and an electrolytic solution, the coin type battery 1 described above was produced in a glove box provided with an argon gas (Ar) atmosphere in which a dew point had been controlled at −80° C.

As the negative electrode 3b, a negative electrode sheet was used which had been produced by coating a copper foil punched to have a discoid shape having a diameter of 14 mm with graphite powder having an average particle diameter of about 20 µm and polyvinylidene fluoride. As the separator 3c, a polyethylene porous membrane having a film thickness of 25 µm was used. As the electrolytic solution, used was an equal volume mixture of ethylene carbonate (EC) and diethyl carbonate (DEC) with $LiClO_4$ of 1M as a supporting electrolyte (manufactured by TOMIYAMA PURE CHEMICAL INDUSTRIES, Ltd.).

The initial discharge capacity, the cycle capacity retention rate and the positive electrode resistance for evaluating performances of the produced coin type battery 1 were defined as follows.

For determining the initial discharge capacity, the coin type battery 1 was left to stand for about 24 hours following production. After an open circuit voltage (OCV) was stabilized, the coin type battery 1 was charged with an electric current density to the positive electrode 0.1 mA/cm² up to a cut-off voltage of 4.3 V. After pausing for 1 hour, the coin type battery 1 was discharged down to a cut-off voltage of 3.0 V and a capacity at that time was determined as an initial discharge capacity.

For determining the cycle capacity retention rate, the coin type battery 1 was charged and discharged with an electric current density to the positive electrode 2 mA/cm², and a cycle of charging up to 4.2 V and discharging down to 3.0 V was repeated 500 times. A ratio of the discharge capacity after repeating the charge and discharge to the initial discharge capacity was calculated to determine a capacity retention rate. For the measurement of the charge and discharge capacities, a multichannel voltage/electric current generator (R6741A, manufactured by Advantest Corporation) was used.

Further, for the positive electrode resistance, the coin type battery 1 was charged at a charging potential of 4.1 V, and then a frequency response analyzer and a Potentio/Galvanostat (1255B, manufactured by Solartron) were used for measurement with an alternating current impedance method to obtain a Nyquist plot shown in FIG. 9. A value of the positive electrode resistance was calculated using an equivalent circuit based on this Nyquist plot by fitting calculation.

In Examples of the present invention, special grade reagents manufactured by Wako Pure Chemical Industries, Ltd. were used for producing composite hydroxides, cathode active materials and secondary batteries.

Example 1

Step of Producing Composite Hydroxide

A composite hydroxide was prepared using the method of the present invention as in the following.

A reaction vessel of 34 L was first filled half full of water. Thereafter, while stirring the water, a temperature in the vessel was set to 70° C., and nitrogen gas was introduced into the reaction vessel to form a nitrogen atmosphere. At that time, a concentration of oxygen in the space of the reaction vessel was 2.0% by volume.

A 25% aqueous sodium hydroxide solution was appropriately added to water in the reaction vessel, and an aqueous solution before the reaction in the vessel was adjusted to have a pH of 12.6 in terms of pH as measured at a liquid temperature of 25° C. as a standard.

(Nucleation Step)

Next, nickel sulfate and cobalt sulfate were dissolved in water to form a 1.8 mol/L mixed aqueous solution. In this mixed aqueous solution, a molar ratio of each metal element was adjusted to be Ni:Co=0.76:0.14.

The mixed aqueous solution was added to the aqueous solution before the reaction in the reaction vessel at a rate of 88 ml/min. Nucleation was then performed by a crystallization for 2 minutes and 30 seconds while the pH of the obtained aqueous solution for nucleation was controlled at 12.6 (pH for nucleation) at the liquid temperature of 25° C. as a standard.

(Particle Growth Step)

Thereafter, supply of only the 25% aqueous sodium hydroxide solution was temporarily suspended until the pH of the aqueous solution for nucleation became 10.2 (pH for particle growth) at the liquid temperature of 25° C. as a standard to obtain an aqueous solution for particle growth.

After the pH of an aqueous reaction solution reached 10.2 to prepare the aqueous solution for particle growth, supply of the 25% aqueous sodium hydroxide solution was started again to cause particle growth for 2 hours with the pH controlled at 10.2.

When the reaction vessel was filled up, the supply of the mixed aqueous solution and the aqueous sodium hydroxide solution was terminated and the stirring was stopped, and the reaction solution was stood still to induce precipitation of a product. Subsequently, after a half amount of supernatant was drawn out from the reaction vessel, the supply of the mixed aqueous solution and the aqueous sodium hydroxide solution was started again and crystallization was performed for 2 hours (for 4 hours in total), and then the particle growth was completed. Thereafter, the obtained product was washed with water, filtrated and dried to obtain particles.

The obtained particles were transferred to another reaction vessel and mixed with water at an ordinary temperature to form a slurry. An aqueous solution of sodium aluminate and sulfuric acid were added to this mixed aqueous solution, while stirring to adjust the pH of the slurry to 9.5. Thereafter, surfaces of nickel cobalt composite hydroxide particles were covered with aluminum hydroxide by continuing stirring for 1 hour. At that time, the aqueous solution of sodium aluminate was added such that a molar ratio of metal elements of Ni:Co:Al in the slurry became 0.76:0.14:0.10.

After the stirring was stopped, the aqueous solution was filtered and the particles covered with aluminum hydroxide were washed with water to obtain a composite hydroxide. Thus obtained composite hydroxide was subjected to a chemical analysis, and revealed a composition of $Ni_{0.76}Co_{0.14}Al_{0.10}(OH)_{2+\alpha}$ ($0 \leq \alpha \leq 0.5$). As shown in FIG. 5, measurement of a particle size distribution of the composite hydroxide particles verified that an average particle diameter was 3.9 μm and a value represented by the expression of: [(d90−d10)/average particle diameter] was 0.44.

From an SEM photograph (FIG. 6) showing results of observation of the obtained composite hydroxide particles with an SEM (scanning electron microscope S-4700, manufactured by Hitachi High-Technologies Corporation,), it was ascertained that the obtained composite hydroxide particles were nearly spherical, and had an almost even particle diameter. At a cross section of the particle, a central portion having primary particles with a particle diameter thereof of 0.05 μm and an outer shell portion having primary particles with a particle diameter thereof of 0.8 μm were observed and a thickness of the outer shell portion was 1.2 μm (FIG. 7).
(Step of Producing Cathode Active Material)

The above composite hydroxide particles were subjected to a heat treatment in an air flow (oxygen concentration: 21% by volume) at a temperature of 700° C. for 6 hours, and composite oxide particles were obtained.

Lithium hydroxide was weighed such that a ratio of Li/Me became 1.06 (atomic ratio), and mixed with the obtained composite oxide particles to form a lithium mixture. The mixing was performed using a shaker-mixer apparatus (TURBULA® Type T2C, manufactured by Willy A Bachofen (WAB) AG).

Thus resulting lithium mixture was subjected to calcination in an oxygen flow (oxygen concentration: 100% by volume) at 500° C. for 4 hours, thereafter calcinated at 760° C. for 12 hours, and cooled followed by disintegrating to obtain a cathode active material.

As shown in FIG. 5, measurement of the particle size distribution of the obtained cathode active material revealed that an average particle diameter was 4.1 μm and a value represented by the expression of: [(d90−d10)/average particle diameter] was 0.6. A specific surface area was 1.5 m²/g and a value represented by the expression of: [specific surface area×average particle diameter] as a marker indicating a size of an area for reaction was 6.2.

Moreover, when an SEM observation of the cathode active material was performed in a similar manner to the composite hydroxide particles, it was ascertained that the obtained cathode active material was nearly spherical, and had an almost even particle diameter as is shown in the SEM photograph (FIG. 6). When a cross section of the particle was observed, a hollow portion and an outer shell portion were recognized and a thickness of the outer shell portion was 1 μm.

Additionally, a powder X-ray diffraction analysis of the obtained cathode active material with a Cu—Kα ray verified that the material had a single phase of a hexagonal layered crystal lithium-nickel-cobalt composite oxide.

Furthermore, a chemical analysis of the cathode active material verified a composition containing Li of 7.57% by mass, Ni of 45.9% by mass, Co of 8.59% by mass and Al of 2.81% by mass, indicating to be $Li_{1.057}Ni_{0.76}Co_{0.14}Al_{0.10}O_2$.
(Battery Evaluation)

A coin type battery 1 having a positive electrode formed with the cathode active material was subjected to a charge and discharge test, which revealed that the coin type battery 1 had an initial discharge capacity of 181.5 mAh/g, a discharge capacity after 500 cycles of 163.4 mAh/g, and a capacity retention rate after 500 cycles of 90% as shown in FIG. 5. Additionally, a positive electrode resistance was shown to be 3.2Ω.

With regard to Examples 2 to 11 and Comparative Examples 1 to 5 below, only substances and conditions changed from the aforementioned Example 1 are referred to. Additionally, results of each evaluation of Examples 2 to 11 and Comparative Examples 1 to 5 are shown in FIG. 5.

Example 2

A cathode active material for a nonaqueous electrolyte secondary battery was obtained in a similar manner to Example 1 except that after the calcinating, the lithium mixture was washed with water and mixed with water so as to adjust concentration of the slurry to 1000 g/L followed by stirring, and thereafter filtered and dried. Performances of the obtained cathode active material for a nonaqueous electrolyte secondary battery were evaluated in a similar manner to Example 1.

A chemical analysis of the obtained hollow cathode active material verified a composition containing Li of 7.27% by mass, Ni of 46.7% by mass, Co of 8.87% by mass and Al of 2.89% by mass, indicating to be $Li_{0.994}Ni_{0.76}Co_{0.14}Al_{0.10}O_2$. A powder X-ray diffraction of the obtained cathode active material verified that the material had a single phase of a hexagonal layered crystal lithium-nickel-cobalt composite oxide.

Example 3

A cathode active material for a nonaqueous electrolyte secondary battery was obtained in a similar manner to Example 1 except that titanium oxide powder was mixed such that a molar ratio of the metal elements in terms of Ni:Co:Al:Ti became 0.756:0.139:0.100:0.005 in the step of producing the composite hydroxide. Performances of the obtained cathode active material for a nonaqueous electrolyte secondary battery were evaluated in a similar manner to Example 1. In the obtained composite hydroxide particle, a central portion having primary particles with a particle diameter thereof of 0.05 μm and an outer shell portion having primary particles with a particle diameter thereof of 0.8 μm were observed and a thickness of the outer shell portion was 1.2 μm.

A chemical analysis of the obtained hollow cathode active material verified a composition containing Li of 7.58% by mass, Ni of 45.7% by mass, Co of 8.30% by mass, Al of 2.86% by mass and Ti of 0.25% by mass, indicating to be $Li_{1.060}Ni_{0.76}Co_{0.14}Al_{0.10}Ti_{0.005}O_2$. A powder X-ray diffraction of the obtained cathode active material verified that the material had a single phase of a hexagonal layered crystal lithium-nickel-cobalt composite oxide. When a cross section of the particle was observed by SEM, a hollow portion and an outer shell portion were recognized and a thickness of the outer shell portion was 0.9 μm.

Example 4

A cathode active material for a nonaqueous electrolyte secondary battery was obtained in a similar manner to Example 1 except that time period for reaction took 30 seconds during the nucleation step in the step of producing the composite hydroxide. Performances of the obtained cathode active material for a nonaqueous electrolyte secondary battery were evaluated in a similar manner to Example 1. In the obtained composite hydroxide particle, a central portion having primary particles with a particle diameter thereof of 0.05 μm and an outer shell portion having primary particles with a particle diameter thereof of 1 μm were observed and a thickness of the outer shell portion was 1.5 μm.

A chemical analysis of the obtained hollow cathode active material verified a composition containing Li of 7.56% by mass, Ni of 45.9% by mass, Co of 8.58% by mass and Al of 2.80% by mass, indicating to be $Li_{1.056}Ni_{0.76}Co_{0.14}Al_{0.10}O_2$. A powder X-ray diffraction of the obtained cathode active material verified that the material had a single phase of a hexagonal layered crystal lithium-nickel-cobalt composite oxide. When a cross section of the particle was observed by SEM, a hollow portion and an outer shell portion were recognized and a thickness of the outer shell portion was 1.4 μm.

Example 5

A composite hydroxide was obtained in a similar manner to Example 1 except that, in the step of producing the composite hydroxide, the mixed aqueous solution was prepared such that a molar ratio of the metal elements in terms of Ni:Co:Nb became 0.76:0.14:0.005 and then crystallization was performed, and that covering with aluminum hydroxide was performed such that a ratio of Ni:Co:Nb:Al became 0.756:0.139:0.005:0.100. In the obtained composite hydroxide particle, a central portion having primary particles with a particle diameter thereof of 0.05 μm and an outer shell portion having primary particles with a particle diameter thereof of 0.8 μm were observed and a thickness of the outer shell portion was 1.2 μm.

A cathode active material for a nonaqueous electrolyte secondary battery was obtained in a similar manner to Example 1 except that a heat treatment temperature was adjusted to 550° C. and a calcinating temperature was adjusted to 745° C. in the step of producing the cathode active material using the obtained composite hydroxide. Performances of the obtained cathode active material for a nonaqueous electrolyte secondary battery were evaluated in a similar manner to Example 1.

A chemical analysis of the obtained hollow cathode active material verified a composition containing Li of 7.60% by mass, Ni of 45.8% by mass, Co of 8.58% by mass, Al of 2.80% by mass and Nb of 0.48% by mass, indicating to be $Li_{1.058}Ni_{0.75}Co_{0.14}Al_{0.10}Nb_{0.005}O_2$. A powder X-ray diffraction of the obtained cathode active material verified that the material had a single phase of a hexagonal layered crystal lithium-nickel-cobalt composite oxide. When a cross section of the particle was observed by SEM, a hollow portion and an outer shell portion were recognized and a thickness of the outer shell portion was 1.0 μm.

Example 6

A composite hydroxide was obtained in a similar manner to Example 1 except that, in the step of producing the composite hydroxide, the mixed aqueous solution was prepared such that a molar ratio of the metal elements in terms of Ni:Co:Zr became 0.76:0.14:0.005 and then crystallization was performed, and that covering with aluminum hydroxide was performed such that a ratio of Ni:Co:Zr:Al became 0.756:0.139:0.005:0.100. In the obtained composite hydroxide particle, a central portion having primary particles with a particle diameter thereof of 0.05 μm and an outer shell portion having primary particles with a particle diameter thereof of 0.8 μm were observed and a thickness of the outer shell portion was 1.2 μm.

A cathode active material for a nonaqueous electrolyte secondary battery was obtained in a similar manner to Example 1 except that a heat treatment temperature was adjusted to 550° C. and a calcinating temperature was adjusted to 745° C. in the step of producing the cathode active material using the obtained composite hydroxide. Performances of the obtained cathode active material for a nonaqueous electrolyte secondary battery were evaluated in a similar manner to Example 1.

A chemical analysis of the obtained hollow cathode active material verified a composition containing Li of 7.62% by mass, Ni of 45.8% by mass, Co of 8.57% by mass, Al of 2.82% by mass and Zr of 0.46% by mass, indicating to be $Li_{1.06}Ni_{0.75}Co_{0.14}Al_{0.10}Zr_{0.005}O_2$. A powder X-ray diffraction of the obtained cathode active material verified that the material had a single phase of a hexagonal layered crystal lithium-nickel-cobalt composite oxide. When a cross section of the particle was observed by SEM, a hollow portion and an outer shell portion were recognized and a thickness of the outer shell portion was 1.0 μm.

Example 7

A composite hydroxide was obtained in a similar manner to Example 1 except that, in the step of producing the composite hydroxide, the mixed aqueous solution was prepared such that a molar ratio of the metal elements in terms of Ni:Co:W became 0.76:0.14:0.005 and then crystallization was performed, and that covering with aluminum hydroxide was performed such that a ratio of Ni:Co:W:Al became 0.756:0.139:0.005:0.100.

A cathode active material for a nonaqueous electrolyte secondary battery was obtained in a similar manner to Example 1 except that a heat treatment temperature was adjusted to 550° C. and a calcinating temperature was adjusted to 745° C. Performances of the obtained cathode active material for a nonaqueous electrolyte secondary battery were evaluated in a similar manner to Example 1.

A chemical analysis of the obtained hollow cathode active material verified a composition containing Li of 7.61% by mass, Ni of 45.9% by mass, Co of 8.58% by mass, Al of 2.81% by mass and W of 0.98% by mass, indicating to be $Li_{1.057}Ni_{0.75}Co_{0.14}Al_{0.10}W_{0.005}O_2$. A powder X-ray diffraction of the obtained cathode active material verified that the material had a single phase of a hexagonal layered crystal lithium-nickel-cobalt composite oxide.

Example 8

A composite hydroxide was obtained in a similar manner to Example 1 except that, in the step of producing the composite hydroxide, a metal salt solution was prepared such that a molar ratio of the metal elements in terms of Ni:Co:Ti became 0.82:0.15:0.03 and then crystallization was performed, and that covering with aluminum hydroxide was not performed.

A cathode active material for a nonaqueous electrolyte secondary battery was obtained in a similar manner to Example 1 except that a calcinating temperature was adjusted to 780° C. in the step of producing the cathode active material using the obtained composite hydroxide. Performances of the obtained cathode active material for a nonaqueous electrolyte secondary battery were evaluated in a similar manner to Example 1.

A chemical analysis of the obtained hollow cathode active material verified a composition containing Li of 7.58% by mass, Ni of 49.8% by mass, Co of 8.99% by mass and Ti of 1.49% by mass, indicating to be $Li_{1.058}Ni_{0.82}Co_{0.15}Ti_{0.03}O_2$. A powder X-ray diffraction of the obtained cathode active material verified that the material had a single phase of a hexagonal layered crystal lithium-nickel-cobalt composite oxide.

Example 9

A cathode active material for a nonaqueous electrolyte secondary battery was obtained in a similar manner to Example 1 except that, in the step of producing the composite hydroxide, a temperature in the vessel was adjusted to 65° C. and nucleation was performed for 30 seconds with the pH of the solution at 13.0 at the liquid temperature of 25° C. as a standard, and thereafter, only supply of the 25% aqueous sodium hydroxide solution was temporarily suspended until the pH of the aqueous reaction solution became 10.8 (pH for particle growth) at the liquid temperature of 25° C. as a standard, and thereafter, the pH of the aqueous reaction solution reached 10.8 in terms of pH as measured at the liquid temperature of 25° C. as a standard, and then supply of the 25% aqueous sodium hydroxide solution was started again to cause particle growth by continuing crystallization for 2 hours with the pH controlled at 10.8. Performances of the obtained cathode active material for a nonaqueous electrolyte secondary battery were evaluated in a similar manner to Example 1. In the obtained composite hydroxide particle, a central portion having primary particles with a particle diameter thereof of 0.05 μm and an outer shell portion having primary particles with a particle diameter thereof of 0.9 μm were observed and a thickness of the outer shell portion was 1.2 μm.

A chemical analysis of the obtained hollow cathode active material verified a composition containing Li of 7.57% by mass, Ni of 45.8% by mass, Co of 8.60% by mass, Al of 2.81% by mass, indicating to be $Li_{1.058}Ni_{0.76}Co_{0.14}Al_{0.10}O_2$. A powder X-ray diffraction of the obtained cathode active material verified that the material had a single phase of a hexagonal layered crystal lithium-nickel-cobalt composite oxide. When a cross section of the particle was observed by SEM, a hollow portion and an outer shell portion were recognized and a thickness of the outer shell portion was 1.1 μm.

Comparative Example 1

Using a reaction vessel for continuous precipitation provided with a piping for overflowing at a top part, crystallization was performed by a general method in which a metal salt solution similar to that in Example 1, an aqueous ammonia solution and a neutralizer solution were added continuously at a constant flow rate while maintaining a pH of the liquid at a constant value of 12.0 at a liquid temperature of 25° C. as a standard, and a overflowing slurry was continuously obtained. A cathode active material for a nonaqueous electrolyte secondary battery was obtained in a similar manner to Example 1 except that a mean residence time in the vessel was adjusted to 10 hours, and a crystallized product was obtained by obtaining the slurry after an equilibrium state was attained in the continuous vessel, followed by performing solid-liquid separation. Performances of the obtained cathode active material for a nonaqueous electrolyte secondary battery were evaluated in a similar manner to Example 1. The obtained cathode active material for a nonaqueous electrolyte secondary battery had a solid structure.

Comparative Example 2

A cathode active material for a nonaqueous electrolyte secondary battery was obtained in a similar manner to Example 1 except that the pH during the nucleation and during the growth was maintained at a constant value of 11.6 at a liquid temperature of 25° C. as a standard. Performances of the obtained cathode active material for a nonaqueous electrolyte secondary battery were evaluated in a similar manner to Example 1. The obtained composite hydroxide particles were uniform inside and the cathode active material for a nonaqueous electrolyte secondary battery had a solid structure.

Comparative Example 3

A nickel composite hydroxide was obtained in a similar manner to Example 1 except that the pH of the aqueous reaction solution during the nucleation and during the growth was maintained at a constant value of 12.6 at a liquid temperature of 25° C. as a standard.

Since additional nuclei were generated during the overall period of the reaction, particles having an indeterminate form with a broad particle size distribution containing gelatinous deposited matter were formed. Thus, the process was stopped due to difficulty in the solid-liquid separation.

Comparative Example 4

A cathode active material for a nonaqueous electrolyte secondary battery was obtained and evaluated in a similar manner to Example 1 except that a temperature in the calcinating condition at 860° C. for 12 hours was employed. According to the results of X-ray diffraction measurement, the hexagonal crystal structure was collapsed, and any performance as a cathode active material could not be expected. Therefore, the evaluation of the battery was not performed.

Comparative Example 5

A cathode active material for a nonaqueous electrolyte secondary battery was obtained in a similar manner to Example 1 except that a temperature in the calcinating condition was adjusted to 680° C. Performances of the obtained cathode active material for a nonaqueous electrolyte secondary battery were evaluated in a similar manner to Example 1. Since the initial capacity was significantly reduced, the evaluation of the cycle capacity retention rate was not performed.

(Evaluation)

Results shown in the table in FIG. 5 suggest the following.

Since the composite hydroxide particles and cathode active materials obtained in Examples 1 to 9 were produced according to the present invention, both of the average particle diameters and the values represented by the expression of [(d90−d10)/average particle diameter] as a marker indicating spreading of the particle size distribution fell within a preferable range, and the particles had a favorable particle diameter distribution and an almost even particle diameter. The coin type batteries 1 produced using these cathode active materials had a high initial discharge capacity, superior cycle characteristics, and also a low positive electrode resistance. Accordingly, batteries having excellent characteristics were provided.

Since a continuous precipitation method was used in Comparative Example 1, the nucleation and the particle growth could not be separately performed, leading to failure in keeping the particle growth time period constant; therefore, a broad particle size distribution was provided. Accordingly, the coin type battery 1 had inferior cycle characteristics although a high initial discharge capacity was attained.

Since the pHs during both the nuclear growth and particle growth were not higher than 12 in Comparative Example 2, the amount of nucleation was insufficient, and thus the composite hydroxide particles and the cathode active material both had large particle diameters. Accordingly, the coin type battery 1 for which this cathode active material was used had an insufficient surface area for reaction, resulting in a high positive electrode resistance.

Since the pHs during both the nuclear growth and particle growth were not lower than 12 in Comparative Example 3, additional nuclei were generated during the overall period of the reaction, and particles became finer and aggregated. A broad particle size distribution was therefore provided, and also production of the cathode active material became difficult.

Since the steps of producing the cathode active materials in Comparative Examples 4 and 5 were not performed according to those of the present invention, cathode active materials having favorable characteristics could not be obtained. Additionally, the coin type battery 1 for which the obtained cathode active material of Comparative Example 5 was used had a large positive electrode resistance, and also had inferior initial discharge capacity.

The foregoing results suggest that a nonaqueous electrolyte secondary battery for which the nickel composite hydroxide particles and the cathode active material obtained in each Example are used has a high initial discharge capacity, excellent cycle characteristics, a low positive electrode resistance and excellent characteristics.

INDUSTRIAL APPLICABILITY

The nonaqueous electrolyte secondary battery of the present invention is suitable for electric power supplies of small size mobile electronic devices which consistently require a high capacity (laptop computers, mobile phone terminals, etc.), and also suitable for batteries for electric automobiles which require a high power.

Additionally, the nonaqueous electrolyte secondary battery of the present invention is superior in safety, and size reduction and increase of the output are enabled; therefore, it is suitable for electric power supplies for electric automobiles having limited mounting space.

Moreover, the nonaqueous electrolyte secondary battery of the present invention can be adopted not only to electric power supplies for electric automobiles exclusively driven by electric energy, but also to electric power supplies for so-called hybrid automobiles in which a combustion engine such as a gasoline engine or diesel engine is used in combination.

REFERENCE SIGNS LIST 1 coin type battery
2 case
3 electrode
3a positive electrode
3b negative electrode
3c separator

The invention claimed is:

1. A cathode active material for a nonaqueous electrolyte secondary battery including a lithium nickel composite oxide of a lithium-containing composite oxide and represented by the general formula (II):

$$Li_tNi_{1-x-y}Co_xM_yO_2 \quad (II)$$

where: $0.95 \leq t \leq 1.15$; $0 \leq x \leq 0.22$; $0 \leq y \leq 0.15$; $x+y<0.3$; and M is at least one additional element selected from the group consisting of Mg, Al, Ca, Ti, V, Cr, Mn, Zr, Nb, Mo and W, wherein the cathode active material has an average particle diameter of 2 to 8 μm, a value represented by an expression of: [(d90−d10)/average particle diameter] as a marker indicating spreading of a particle size distribution is 0.65 or less, and a value represented by an expression of [specific surface area in m²/g× average particle diameter in μm] as a marker indicating a size of an area for reaction is 5.5 or more, wherein the cathode active material for a nonaqueous electrolyte secondary battery is formed with hollow particles each of which has a space portion in a central portion of a lithium nickel composite oxide particle and an outer shell portion formed with the lithium nickel composite oxide outside the space portion, and wherein the cathode active material for a nonaqueous electrolyte secondary battery is produced by a method, the method comprising:

a step of subjecting nickel composite hydroxide particles to a heat treatment, the nickel composite hydroxide particles including a nickel composite hydroxide represented by the general formula (I):

$$Ni_{1-x-y}Co_xM_y(OH)_{2+\alpha} \quad (I)$$

where: $0 \leq x \leq 0.22$; $0 \leq y \leq 0.15$; $x+y<0.3$; $0 \leq \alpha \leq 0.5$; and M is at least one additional element selected from the group consisting of Mg, Al, Ca, Ti, V, Cr, Mn, Zr, Nb, Mo and W, the nickel composite hydroxide particles being spherical secondary particles formed by aggregation of a plurality of primary particles, wherein the secondary particles have an average particle diameter of 2 to 7 μm, and a value represented by an expression of: [(d90−d10)/average particle diameter] as a marker indicating spreading of a particle size distribution is 0.55 or less, and each of the secondary particles has a central portion of primary particles and an outer shell portion of platy or needle shaped primary particles outside the central portion, the platy or needle shaped primary particles being larger than the primary particles forming the central portion;

a mixing step of forming a lithium mixture by mixing a lithium compound with the nickel composite hydroxide particles after the heat treatment; and a calcinating step of calcinating the lithium mixture prepared in the mixing step at a temperature of 700° C. to 850° C., wherein the cathode active material comprises a central portion having primary particles and an outer shell portion having platy or needle shaped primary particles, and the primary particles in the outer shell portion are larger than the primary particles in the central portion.

2. The cathode active material for a nonaqueous electrolyte secondary battery according to claim 1, wherein an average thickness of the outer shell portions is 0.3 to 3 μm at cross sections of the lithium nickel composite oxide particles.

3. A nonaqueous electrolyte secondary battery comprising:
   a positive electrode formed with the cathode active material for a nonaqueous electrolyte secondary battery according to claim 1.

* * * * *